(12) United States Patent
Snibbe et al.

(10) Patent No.: US 10,031,921 B2
(45) Date of Patent: *Jul. 24, 2018

(54) METHODS AND SYSTEMS FOR STORAGE OF MEDIA ITEM METADATA

(71) Applicant: Facebook, Inc., Menlo Park, CA (US)

(72) Inventors: Scott Snibbe, San Francisco, CA (US); Graham McDermott, Berkeley, CA (US); Justin Ponczek, San Francisco, CA (US); Spencer Schoeben, Palo Alto, CA (US); Jesse Fulton, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/816,984

(22) Filed: Aug. 3, 2015

(65) Prior Publication Data

US 2015/0339295 A1 Nov. 26, 2015

Related U.S. Application Data

(63) Continuation of application No. 14/608,105, filed on Jan. 28, 2015, now Pat. No. 9,116,912.

(Continued)

(51) Int. Cl.
*G06F 17/00* (2006.01)
*G06F 17/30* (2006.01)
(Continued)

(52) U.S. Cl.
CPC .... *G06F 17/30176* (2013.01); *G06F 17/3002* (2013.01); *G06F 17/30017* (2013.01);
(Continued)

(58) Field of Classification Search
CPC ................................................ G06F 17/30017
See application file for complete search history.

(56) References Cited

U.S. PATENT DOCUMENTS

| 6,493,872 B1 | 12/2002 | Rangan |
| 8,209,723 B2 | 6/2012 | Sakaguchi et al. |

(Continued)

FOREIGN PATENT DOCUMENTS

| CA | 2975416 C | 3/2018 |
| EP | 2575131 | 9/2011 |

(Continued)

OTHER PUBLICATIONS

Eyegroove, Inc., Communication Pursuant to Rules 161(2) and 162, EP15705154.1, Sep. 20, 2016, 2 pgs.

(Continued)

*Primary Examiner* — Ajith Jacob
(74) *Attorney, Agent, or Firm* — Kilpatrick Townsend & Stockton LLP

(57) ABSTRACT

The various embodiments described herein include methods and systems for storage of media item metadata. In one aspect, a method is performed at a server system with one or more processors and memory. The method includes receiving, from a client device, metadata corresponding to a modified media item, where the modified media item is a modified version of a media item corresponding to a particular node in a family tree within a database of media items. The method further includes, in response to receiving the metadata corresponding to the modified media item, appending, to the family tree, a new leaf node that is linked to the particular node, where the new leaf node corresponds to the modified media item.

23 Claims, 21 Drawing Sheets

Related U.S. Application Data

(60) Provisional application No. 61/934,681, filed on Jan. 31, 2014.

(51) Int. Cl.

| | | |
|---|---|---|
| *H04N 21/854* | (2011.01) | |
| *H04N 21/234* | (2011.01) | |
| *H04N 21/233* | (2011.01) | |
| *H04N 21/242* | (2011.01) | |
| *H04N 21/235* | (2011.01) | |
| *G11B 27/031* | (2006.01) | |
| *G11B 27/10* | (2006.01) | |
| *H04N 5/08* | (2006.01) | |
| *H04N 5/93* | (2006.01) | |
| *H04N 21/462* | (2011.01) | |
| *H04N 21/43* | (2011.01) | |

(52) U.S. Cl.
CPC .. *G06F 17/30091* (2013.01); *G06F 17/30327* (2013.01); *G06F 17/30345* (2013.01); *G06F 17/30876* (2013.01); *G11B 27/031* (2013.01); *G11B 27/10* (2013.01); *H04N 5/08* (2013.01); *H04N 5/9305* (2013.01); *H04N 21/233* (2013.01); *H04N 21/2353* (2013.01); *H04N 21/23424* (2013.01); *H04N 21/242* (2013.01); *H04N 21/854* (2013.01); *H04N 21/4307* (2013.01); *H04N 21/4622* (2013.01)

(56) References Cited

U.S. PATENT DOCUMENTS

| | | |
|---|---|---|
| 8,258,390 B1 | 9/2012 | Gossweiler et al. |
| 8,594,714 B2 | 11/2013 | Wu |
| 8,745,500 B1 | 6/2014 | Kostello et al. |
| 8,806,320 B1 | 8/2014 | Abdo |
| 8,996,538 B1 | 3/2015 | Cremer et al. |
| 9,116,912 B1 | 8/2015 | Snibbe et al. |
| 9,207,844 B2 | 12/2015 | Snibbe et al. |
| 9,207,857 B2 | 12/2015 | Snibbe et al. |
| 9,268,787 B2 | 2/2016 | Snibbe et al. |
| 9,519,644 B2 | 12/2016 | Snibbe et al. |
| 2004/0095379 A1 | 5/2004 | Chang et al. |
| 2004/0096379 A1 | 5/2004 | Furste et al. |
| 2005/0078947 A1 | 4/2005 | Chung |
| 2006/0005143 A1 | 1/2006 | Sakkinen et al. |
| 2006/0064716 A1 | 3/2006 | Sull et al. |
| 2006/0212478 A1 | 9/2006 | Plastina et al. |
| 2007/0061724 A1 | 3/2007 | Slothouber et al. |
| 2007/0188657 A1 | 8/2007 | Basson et al. |
| 2007/0204003 A1 | 8/2007 | Abramson |
| 2007/0250896 A1 | 10/2007 | Parker et al. |
| 2008/0092047 A1 | 4/2008 | Fealkoff et al. |
| 2008/0136940 A1 | 6/2008 | Srikanth et al. |
| 2008/0208692 A1 | 8/2008 | Garaventi et al. |
| 2008/0209482 A1 | 8/2008 | Meek et al. |
| 2008/0256086 A1 | 10/2008 | Miyoshi et al. |
| 2008/0274687 A1 | 11/2008 | Roberts et al. |
| 2009/0100361 A1 | 4/2009 | Abello et al. |
| 2009/0150797 A1 | 6/2009 | Burkholder et al. |
| 2009/0271283 A1 | 10/2009 | Fosnacht |
| 2010/0223128 A1 | 9/2010 | Dukellis et al. |
| 2010/0223314 A1 | 9/2010 | Gadel |
| 2011/0066940 A1 | 3/2011 | Kamrani et al. |
| 2011/0163969 A1 | 7/2011 | Anzures et al. |
| 2012/0026397 A1 | 2/2012 | Gummagatta |
| 2012/0233644 A1 | 9/2012 | Rao |
| 2012/0254925 A1 | 10/2012 | Nassiri |
| 2013/0047081 A1 | 2/2013 | Long et al. |
| 2013/0070093 A1 | 3/2013 | Rivera |
| 2013/0117692 A1 | 5/2013 | Padmanabhan et al. |
| 2013/0218942 A1 | 8/2013 | Willis et al. |
| 2013/0238696 A1 | 9/2013 | Cotelo |
| 2013/0273968 A1 | 10/2013 | Rhoads et al. |
| 2013/0311886 A1 | 11/2013 | Ku et al. |
| 2014/0040742 A1 | 2/2014 | Park et al. |
| 2014/0074712 A1 | 3/2014 | Palmer et al. |
| 2014/0115469 A1 | 4/2014 | Pendergast et al. |
| 2014/0229831 A1 | 8/2014 | Chordia et al. |
| 2014/0237365 A1 | 8/2014 | Oberbrunner et al. |
| 2015/0066780 A1 | 3/2015 | Cohen |
| 2015/0067514 A1 | 3/2015 | Lewis et al. |
| 2015/0067726 A1 | 3/2015 | Glasser |
| 2015/0220249 A1 | 8/2015 | Snibbe et al. |
| 2015/0220558 A1 | 8/2015 | Snibbe et al. |
| 2015/0221339 A1 | 8/2015 | Snibbe et al. |
| 2015/0234564 A1 | 8/2015 | Snibbe et al. |
| 2015/0286716 A1 | 10/2015 | Snibbe et al. |
| 2015/0341707 A1 | 11/2015 | Snibbe et al. |
| 2016/0054873 A1 | 2/2016 | Snibbe et al. |
| 2016/0173960 A1 | 6/2016 | Snibbe et al. |
| 2017/0040039 A1 | 2/2017 | Snibbe et al. |
| 2017/0325007 A1 | 11/2017 | Snibbe et al. |

FOREIGN PATENT DOCUMENTS

| | | |
|---|---|---|
| EP | 3100182 | 12/2016 |
| EP | 3100268 | 12/2016 |
| WO | WO2011/066432 A2 | 6/2011 |
| WO | 2015116839 | 8/2015 |
| WO | 2015116841 | 8/2015 |

OTHER PUBLICATIONS

Eyegroove, Inc., International Preliminary Report on Patentability, PCT/US2015/013570, dated Aug. 2, 2016, 8 pgs.

Chavanu, B., Create your own music video with video star, Retrieved from the wayback machine dated Jun. 13, 2012. Available at: http://web.archive.org/web/20120613172308/http://www.makeuseof.com/tag/create-your-own-music-video-with-video-star/ 16 pgs.

Eyegroove, Inc., International Search Report and Written Opinion, PCT/US2015/013568, dated Apr. 14, 2015, 8 pgs.

Eyegroove, Inc., International Search Report and Written Opinion, PCT/US2015/013570, dated May 20, 2015, 11 pgs.

Handler, A., iMovie for iPhone, Jan. 24, 2013, downloaded from http://examples.oreilly.com/9781449393656/iMovie_for_iPhone, 34 pgs.

U.S. Appl. No. 14/608,097, First Action Interview Pilot Program Pre-Interview Communication dated Sep. 8, 2015, 5 pages.

U.S. Appl. No. 14/608,097, Notice of Allowance dated Oct. 14, 2015, 11 pages.

U.S. Appl. No. 14/608,099, Non-Final Office Action dated Apr. 20, 2015, 14 pages.

U.S. Appl. No. 14/608,099, Notice of Allowance dated Aug. 6, 2015, 8 pages.

U.S. Appl. No. 14/608,103, Notice of Allowance dated Aug. 11, 2015, 19 pages.

U.S. Appl. No. 14/608,103, Pre-Interview First Office Action dated Apr. 30, 2015, 5 pages.

U.S. Appl. No. 14/608,105, Notice of Allowance dated Mar. 27, 2015, 9 pages.

U.S. Appl. No. 14/608,108, Final Office Action dated Feb. 26, 2016, 11 pages.

U.S. Appl. No. 14/608,108, Final Office Action dated Aug. 14, 2015, 12 pages.

U.S. Appl. No. 14/608,108, Non-Final Office Action dated Nov. 12, 2015, 14 pages.

U.S. Appl. No. 14/608,108, Notice of Allowance dated Jul. 15, 2016, 7 pages.

U.S. Appl. No. 14/608,108, Pre-Interview First Office Action dated Mar. 26, 2015, 5 pages.

U.S. Appl. No. 14/820,477, Final Office Action dated Feb. 9, 2017, 20 pages.

U.S. Appl. No. 14/820,477, Final Office Action dated Sep. 29, 2017, 22 pages.

U.S. Appl. No. 14/820,477, Non-Final Office Action dated Jun. 17, 2016, 16 pages.

(56) References Cited

OTHER PUBLICATIONS

U.S. Appl. No. 14/820,477, Non-Final Office Action dated Apr. 26, 2017, 20 pages.
U.S. Appl. No. 15/051,618, Non-Final Office Action dated Sep. 6, 2017, 18 pages.
U.S. Appl. No. 15/297,062, Non-Final Office Action dated Sep. 25, 2017, 7 pages.
Canadian Application No. 2,975,411, Office Action dated Sep. 15, 2017, 7 pages.
European Application No. 12820426.0, Supplemental European Search Report dated Feb. 27, 2015, 6 pages.
European Application No. 15705155.8, Communication Pursuant to Rules 161(2) and 162 mailed on Sep. 28, 2016, 2 pages.
International Application No. PCT/US2015/013568, International Preliminary Report on Patentability dated Aug. 11, 2016, 7 pages.
Canadian Application No. 2,975,416, Notice of Allowance dated Nov. 21, 2017, 1 page.
U.S. Appl. No. 14/820,477, Non-Final Office Action dated Jan. 12, 2018, 21 pages.
U.S. Appl. No. 15/297,062, Notice of Allowance dated Jan. 16, 2018, 8 pages.
U.S. Appl. No. 15/297,062, Corrected Notice of Allowance dated Feb. 13, 2018, 5 pages.
Non-Final Office Action for U.S. Appl. No. 14/933,921, dated Mar. 12, 2018, 13 pages.
Non-Final Office Action for U.S. Appl. No. 14/933,940, dated Mar. 12, 2018, 11 pages.
Corrected Notice of Allowance for U.S. Appl. No. 15/297,062, dated Apr. 2, 2018, 4 pages.

METHODS AND SYSTEMS FOR STORAGE OF MEDIA ITEM METADATA

PRIORITY CLAIM AND RELATED APPLICATIONS

This application is a continuation of U.S. patent application Ser. No. 14/608,105, filed Jan. 28, 2015, which itself claims priority to U.S. Provisional Patent Application No. 61/934,681, filed Jan. 31, 2014, each of which is hereby incorporated by reference in its entirety.

This application is related to U.S. patent application Ser. No. 14/608,097, filed Jan. 28, 2015, entitled "Methods and Devices for Synchronizing and Sharing Media Items," U.S. patent application Ser. No. 14/608,099, filed Jan. 28, 2015, entitled "Methods and Devices for Touch-Based Media Creation," U.S. patent application Ser. No. 14/608,103, filed Jan. 28, 2015, entitled "Methods and Devices for Presenting Interactive Media Items," and U.S. patent application Ser. No. 14/608,108, filed Jan. 28, 2015, entitled "Methods and Devices for Generating Media Items," each of which is hereby incorporated by reference in its entirety.

TECHNICAL FIELD

The present invention relates to the field of Internet technologies, and more particularly to presenting and modifying media items.

BACKGROUND OF THE INVENTION

As wireless networks and the processing power of mobile devices have improved, web-based applications increasingly allow everyday users to create original content in real-time without professional software. For example, Instagram and Vine allow a user to create original media content that is personalized to the user's tastes—anytime and anywhere. Despite the advances in the provision of web-based media creation applications, some solutions for creating media content are clumsy or ill-suited to future improvements in provisioning media content.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to present, modify, and manage media items.

In some embodiments, a client-side method of presenting a media item is performed at a client device (e.g., client device 104, FIGS. 1-2) with one or more processors and memory. The method includes detecting a user input to play the media item, where the media item is associated with at least a portion of an audio track and one or more media files. The method also includes: requesting the media item from a server in response to the user input; in response to the request, receiving, from the server, the one or more media files and information identifying at least the portion of the audio track; and obtaining at least the portion of the audio track based on the information identifying at least the portion of the audio track. The method further includes: displaying the one or more media files; and, while displaying the one or more media files, playing back at least the portion of the audio track in synchronization with the one or more media files.

In some embodiments, a client-side method of modifying a pre-existing media item is performed at a client device (e.g., client device 104, FIGS. 1-2) with one or more processors and memory. The method includes displaying a family tree associated with a root media item including a plurality of leaf nodes stemming from a genesis node, where: the genesis node corresponds to the root media item and a respective leaf node of the plurality of leaf nodes corresponds to a modified media item, where the modified media item is a modified version of the root media item; and the genesis node corresponding to the root media item and the respective leaf node corresponding to the first modified media item include metadata structures, where a respective metadata structure includes first information identifying one or more audio tracks, second information identifying one or more media files, and third information identifying zero or more audio and/or video effects. The method also includes: detecting a first user input selecting one of the nodes in the family tree; and, in response to detecting the first user input, displaying a user interface for editing a media item corresponding to the selected node. The method further includes: detecting one or more second user inputs modifying the media item corresponding to the selected node; and, in response to detecting the one or more second user inputs: modifying a metadata structure associated with the media item that corresponds to the selected node so as to generate modified metadata associated with a new media item; and transmitting, to a server, at least a portion of the modified metadata associated with the new media item.

In some embodiments, a server-side method of maintaining a database is performed at a server system (e.g., server system 108, FIGS. 1 and 3) with one or more processors and memory. The method includes: maintaining a database for a plurality of root media items, where: a respective root media item is associated with a family tree that includes a genesis node and a plurality of leaf nodes; the genesis node corresponds to the respective root media item and a respective leaf node of the plurality of leaf nodes corresponds to a first modified media item, the first modified media item is a modified version of the respective root media item; and the genesis node corresponding to the respective root media item and the respective leaf node corresponding to the first modified media item include metadata structures, where a respective metadata structure includes first information identifying one or more audio tracks, second information identifying one or more media files, and third information identifying zero or more audio and/or video effects. The method also includes receiving, from a client device, at least a portion of modified metadata corresponding to a second modified media item, where the second modified media item is a modified version of a media item corresponding to a respective node in the family tree. The method further includes appending, in response to receiving at least the portion of the modified metadata corresponding to the second modified media item, a new leaf node to the family tree that is linked to the respective node, where the new leaf node corresponds to the second modified media item.

In some embodiments, an electronic device or a computer system (e.g., client device 104, FIGS. 1-2 or server system 108, FIGS. 1 and 3) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device or a computer system (e.g., client device 104, FIGS. 1-2 or server system 108, FIGS. 1 and 3) with one or more processors, cause the electronic device or computer system to perform the operations of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
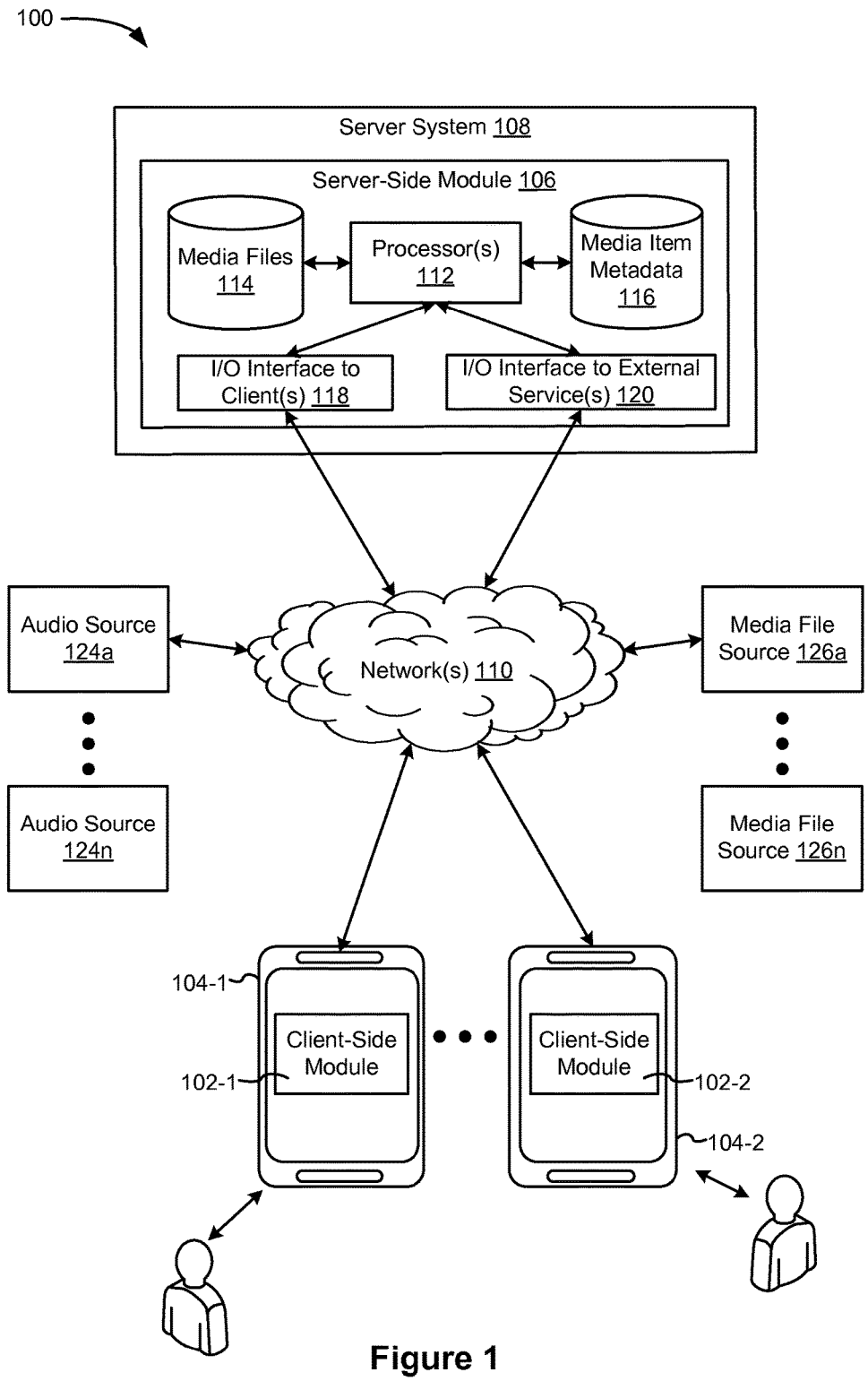
FIG. 1 is a block diagram of a server-client environment in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As shown in FIG. 1, an application for generating, exploring, and presenting media items is implemented in a server-client environment 100 in accordance with some embodiments. In some embodiments, the application includes client-side processing 102-1, 102-2 (hereinafter "client-side module 102") executed on a client device 104-1, 104-2 and server-side processing 106 (hereinafter "server-side module 106") executed on a server system 108. Client-side module 102 communicates with server-side module 106 through one or more networks 110. Client-side module 102 provides client-side functionalities associated with the application (e.g., creation and presentation of media items) such as client-facing input and output processing and communications with server-side module 106. Server-side module 106 provides server-side functionalities associated with the application (e.g., generating metadata structures for, storing portions of, and causing/directing presentation of media items) for any number of client modules 102 each residing on a respective client device 104.

In some embodiments, server-side module 106 includes one or more processors 112, media files database 114, media item metadata database 116, an I/O interface to one or more clients 118, and an I/O interface to one or more external services 120. I/O interface to one or more clients 118 facilitates the client-facing input and output processing for server-side module 106. One or more processors 112 receive requests from client-side module 102 to create media items or obtain media items for presentation. Media files database 114 stores media files, such as images and/or video clips, associated with media items, and media item metadata database 116 stores a metadata structure for each media item, where each metadata structure associates one or more media files and at least a portion of an audio track with a media item. In some embodiments, media files database 114 and media item metadata database 116 are communicatively coupled with but located remotely from server system 116. In some embodiments, media files database 114 and media item metadata database 116 are located separately from one another. In some embodiments, server-side module 106 communicates with one or more external services such as audio sources 124a . . . 124n (e.g., streaming audio service providers such as Spotify, SoundCloud, Rdio, Pandora, and the like) and media file sources 126a . . . 126n (e.g., service provider of images and/or video such as YouTube, Vimeo, Vine, Flickr, Imgur, and the like) through one or more networks 110. I/O interface to one or more external services 120 facilitates such communications.

Examples of client device 104 include, but are not limited to, a handheld computer, a wearable computing device (e.g., Google Glass or a smart watch), a biologically implanted computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, server system 108 is managed by the provider of the application for generating, exploring, and presenting media items. Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Although server-client environment 100 shown in FIG. 1 includes both a client-side portion (e.g., client-side module 102) and a server-side portion (e.g., server-side module 106), in some embodiments, the application is implemented as a standalone application installed on client device 104. In addition, the division of functionalities between the client and server portions can vary in different embodiments. For example, in some embodiments, client-side module 102 is a thin-client that provides only user-facing input and output processing functions, and delegates all other data processing functionalities to a backend server (e.g., server system 108).

Figure 2:
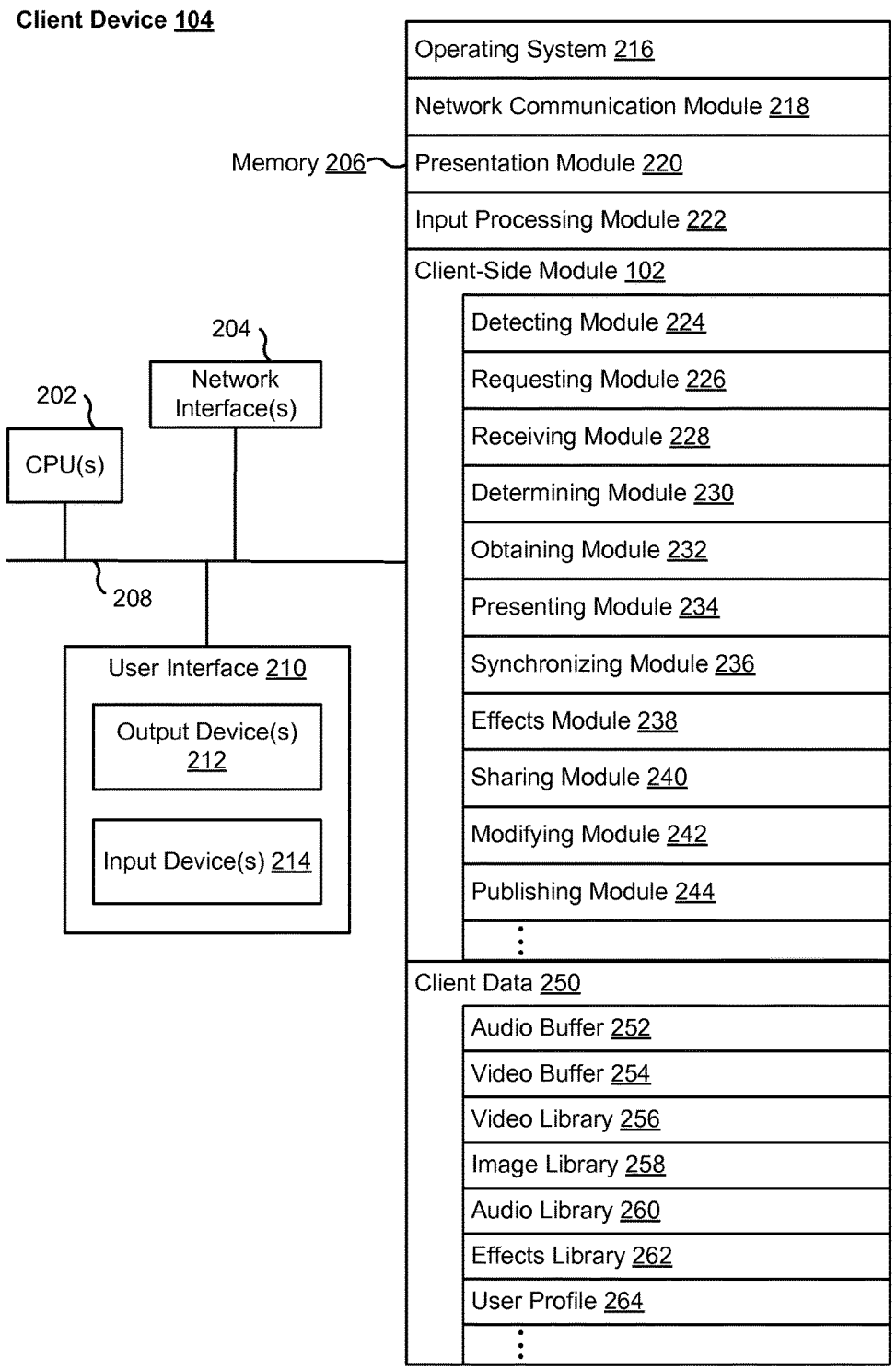
FIG. 2 is a block diagram of a client device in accordance with some embodiments.

FIG. 2 is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices 214, including user interface components that facilitate user input such as a keyboard, a mouse, a voice-command input unit or microphone, an accelerometer, a gyroscope, a touch-screen display, a touch-sensitive input pad, a gesture capturing camera, or other input buttons or controls. Furthermore, some client devices 104 use a microphone and voice recognition, a camera and gesture recognition, a brainwave sensor/display, or biologically implanted sensors/displays (e.g. digital contact lenses, fingertip/muscle implants, and so on) to supplement or replace the keyboard, display, or touch screen. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from one or more processing units 202. Memory 206, or alternatively the non-volatile memory device(s) within memory 206, includes a non-transitory computer readable storage medium. In some implementations, memory 206, or the non-transitory computer readable storage medium of memory 206, stores the following programs, modules, and data structures, or a subset or superset thereof:

- operating system 216 including procedures for handling various basic system services and for performing hardware dependent tasks;
- network communication module 218 for connecting user device 104 to other computing devices (e.g., server system 108, audio sources 124a . . . 124n, and media file sources 126a . . . 126n) connected to one or more networks 110 via one or more network interfaces 204 (wired or wireless);
- presentation module 220 for enabling presentation of information (e.g., a media item, a user interface for an application or a webpage, audio and/or video content, text, etc.) at client device 104 via one or more output devices 212 (e.g., displays, speakers, etc.) associated with user interface 210; and
- input processing module 222 for detecting one or more user inputs or interactions from one of the one or more input devices 214 and interpreting the detected input or interaction.

In some embodiments, memory 206 also includes a client-side module 102 associated with an application for creating, exploring, and playing back media items that includes, but is not limited to:

- detecting module 224 for detecting one or more user inputs corresponding to the application;
- requesting module 226 for querying a server (e.g., server system 108) for a media item;
- receiving module 228 for receiving, from server system 108, one or more media files (e.g., one or more video clips and/or one or more images) and information identifying at least a portion of an audio track associated with the requested media item;
- determining module 230 for determining a source for the audio track associated with the media item;
- obtaining module 232 for obtaining at least the portion of the audio track associated with the audio track;
- presenting module 234 for presenting the requested media item via one or more output devices 212 by displaying the one or more media files associated with the media item on the display and playing back at least the portion of the audio track via the one or more speakers associated with the media item;
- synchronizing module 236 for synchronizing at least the portion of the audio track with the one or more media files;
- effects module 238 for applying audio and/or video effects while displaying the one or more media files and/or playing back at least the portion of the audio track;
- sharing module 240 for sharing the media item via one or more sharing methods (e.g., email, SMS, social media outlets, etc.);
- modifying module 242 for modifying a pre-existing media item so as to generate a new media item based on the pre-existing media item; and
- publishing module 244 for publishing the new media item.

In some embodiments, memory 206 also includes client data 250 for storing data for the application. Client data 250 includes, but is not limited to:

- audio buffer 252 for buffering at least the portion of the obtained audio track for playback;
- video buffer 254 for buffering the one or more media files received from server system 108 for display;
- video library 256 storing one or more pre-existing video clips recorded prior to executing the application;
- image library 258 storing one or more pre-existing images captured prior to executing the application;
- audio library 260 storing one or more pre-existing audio tracks created or stored prior to executing the application;
- effects library 262 including functions for implementing one or more real-time or post-processed audio and/or video effects (e.g., OpenGL Shading Language (GLSL) shaders); and
- user profile 264 including a plurality of preferences associated with the application for the user of client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
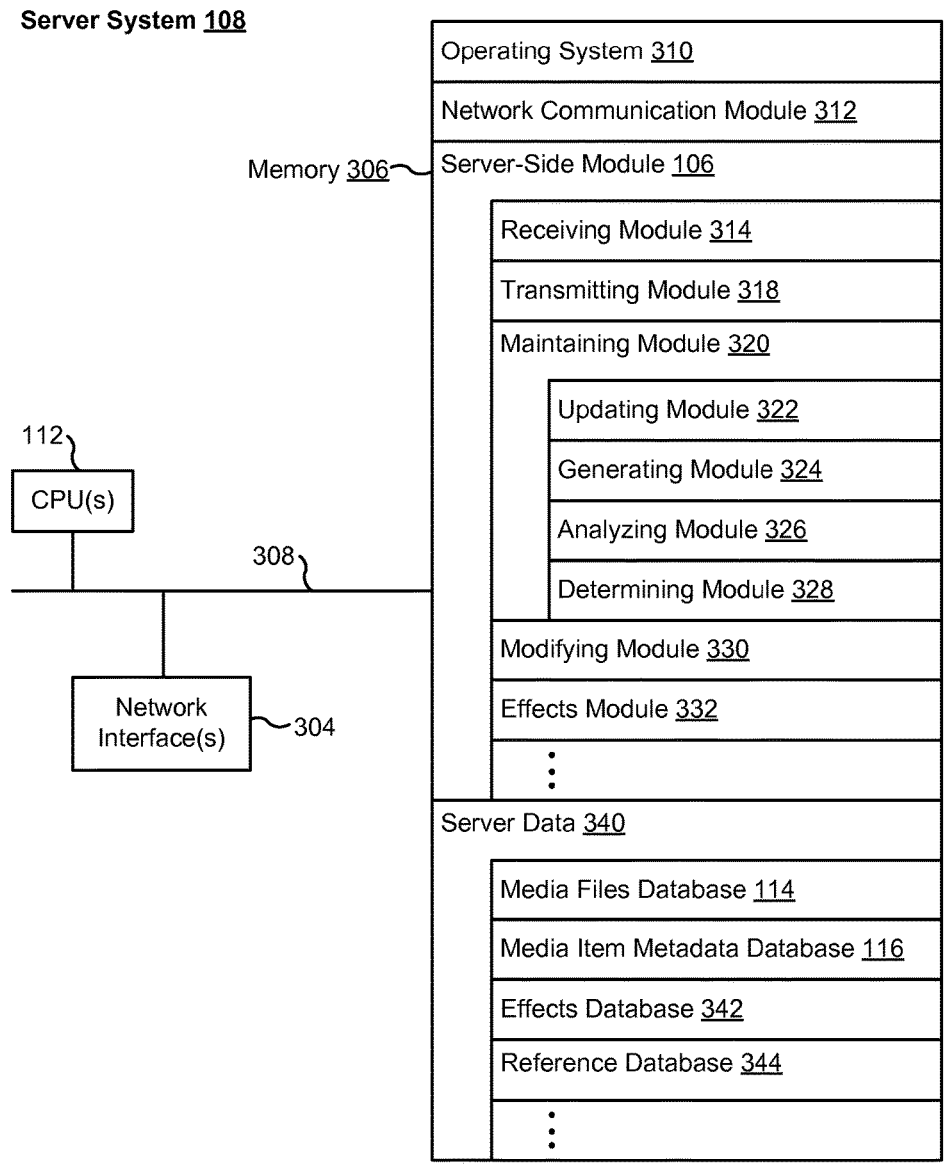
FIG. 3 is a block diagram of a server system in accordance with some embodiments.

FIG. 3 is a block diagram illustrating server system 108 in accordance with some embodiments. Server system 108, typically, includes one or more processing units (CPUs) 112, one or more network interfaces 304 (e.g., including I/O interface to one or more clients 118 and I/O interface to one or more external services 120), memory 306, and one or more communication buses 308 for interconnecting these components (sometimes called a chipset). Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more processing units 112. Memory 306, or alternatively the non-volatile memory device(s) within memory 306, includes a non-transitory computer readable storage medium. In some implementations, memory 306, or the non-transitory computer readable storage medium of memory 306, stores the following programs, modules, and data structures, or a subset or superset thereof:

operating system 310 including procedures for handling various basic system services and for performing hardware dependent tasks;

network communication module 312 that is used for connecting server system 108 to other computing devices (e.g., client devices 104, audio sources 124a ... 124n, and media file sources 126a ... 126n) connected to one or more networks 110 via one or more network interfaces 304 (wired or wireless);

a server-side module 106 associated with the application for generating, exploring, and presenting media items that includes, but is not limited to:

receiving module 314 for receiving a request, from client device 104, to playback a media item or for receiving at least a portion of the modified metadata structure;

transmitting module 318 for transmitting, to client device 104, one or more media files (e.g., one or more video clips and/or a sequence of one or more images) and information identifying at least a portion of an audio track associated with the requested media item; and maintaining module 320 for maintaining media item metadata database 116, including, but not limited to:

updating module 322 for updating one or more fields, tables, and/or entries in a metadata structure associated with a respective media item (e.g., play count, likes, shares, comments, associated media items, and so on);

generating module 324 for generating a metadata structure for a new media item and appending a new node associated with the new media item to a corresponding family tree;

analyzing module 326 for analyzing the audio track and the one or more media files associated with the new media item; and determining module 328 determining whether the analyzed audio track and one or more media files match one of the reference audio tracks and/or video clips in reference database 344;

modifying module 330 for flattening the new media item into a single stream or digital media item or for re-encoding media items for different formats and bit rates;

effects module 332 for receiving and transmitting video and/or audio effects as scripts or computer-readable instructions (e.g., GLSL shaders for use with OpenGL ES) augmented with effect metadata corresponding to effect type, effect version, content, effect parameters, and so on;

server data 340, including but not limited to:

media files database 114 storing one or more media files (e.g., images and/or video clips);

media item metadata database 116 storing a metadata structure for each media item, where each metadata structure associates one or more media files and at least a portion of an audio track with a media item;

effects database 342 storing one or more real-time or post-processed audio and/or video effects as scripts or computer-readable instructions (e.g., GLSL shaders for use with OpenGL ES) augmented with effect metadata corresponding to effect type, effect version, content, effect parameters, a table mapping of interactive input modalities to effect parameters for real-time effect interactivity, and so on; and reference database 344 storing a plurality of reference audio tracks and video clips and associated preferences.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Attention is now directed towards embodiments of user interfaces and associated processes that may be implemented on a respective client device 104 with one or more speakers 402 enabled to output sound, zero or more microphones 404 enabled to receive sound input, and a touch screen 406 enabled to receive one or more contacts and display information (e.g., media content, webpages and/or user interfaces for an application). FIGS. 4A-4I illustrate example user interfaces for presenting and modifying a pre-existing media item in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4I show user interface 408 displayed on client device 104 (e.g., a mobile phone) for an application for generating, exploring, and presenting media items; however, one skilled in the art will appreciate that the user interfaces shown in FIGS. 4A-4I may be implemented on other similar computing devices. The user interfaces in FIGS. 4A-4I are used to illustrate the processes described herein, including the processes described with respect to FIGS. 6A-6C and 7A-7B.

Figure 4A:
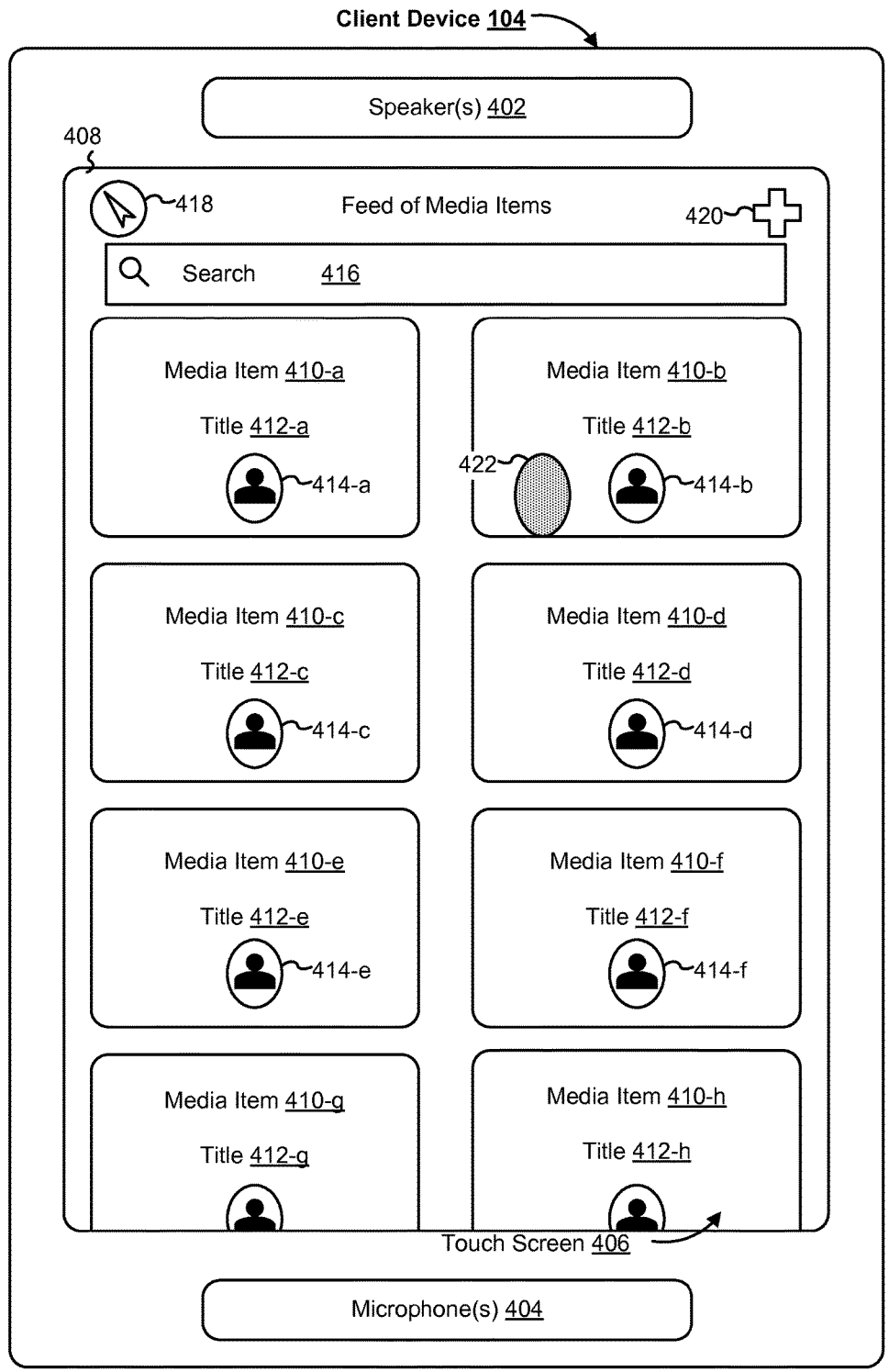
FIGS. 4A-4I illustrate example user interfaces for presenting and modifying a pre-existing media item in accordance with some embodiments.

FIG. 4A illustrates client device 104 displaying a user interface for a feed view of the application that includes a feed of media items on touch screen 406. In FIG. 4A, the user interface includes a plurality of media item affordances 410 corresponding to media items generated by users in a community of users and search query box 416 configured to enable the user of client device 104 to search for media items. In some embodiments, media affordances 410 corresponding to sponsored media items are displayed at the top or near the top of the feed of media items. In some embodiments, advertisements are concurrently displayed with the feed of media items such as banner advertisements or advertisements in a side region of the user interface. In some embodiments, one or more of media item affordances 410 correspond to media items that are advertisements. In FIG. 4A, each of media item affordances 410 includes a title 412 of the corresponding media item and a representation 414 of the user in the community of users who authored the corresponding media item. For example, each of representations 414 includes an image associated with the author of the media item (e.g., a headshot or avatar) or an identifier, name, or handle associated with the author of the media item. In some embodiments, a respective representation 414, when activated (e.g., by a touch input from the user), causes client device 104 to display a profile associated with the author of the corresponding media item.

In FIG. 4A, the user interface also includes navigation affordance 418, which, when activated (e.g., by a touch input from the user), causes client device 104 to display a navigation panel for navigating between user interfaces of the application (e.g., one or more of a feed view, user profile, user media items, friends view, exploration view, settings, and so on) and creation affordance 420, which, when activated (e.g., by a touch input from the user), causes client device 104 to display a first user interface of a process for generating a media item. For further description of the process for generating a media item see U.S. Provisional Patent Application No. 61/934,665, entitled "Methods and Devices for Touch-Based Media Creation," filed Jan. 31, 2014, which is hereby incorporated by reference in its entirety. In FIG. 4A, the user interface includes a portion of media item affordances 410-g and 410-h indicating that the balance of the media items can be viewed by scrolling downwards in the feed view. FIG. 4A also illustrates client device 104 detecting contact 422 at a location corresponding to media item affordance 410-b.

Figure 4B:
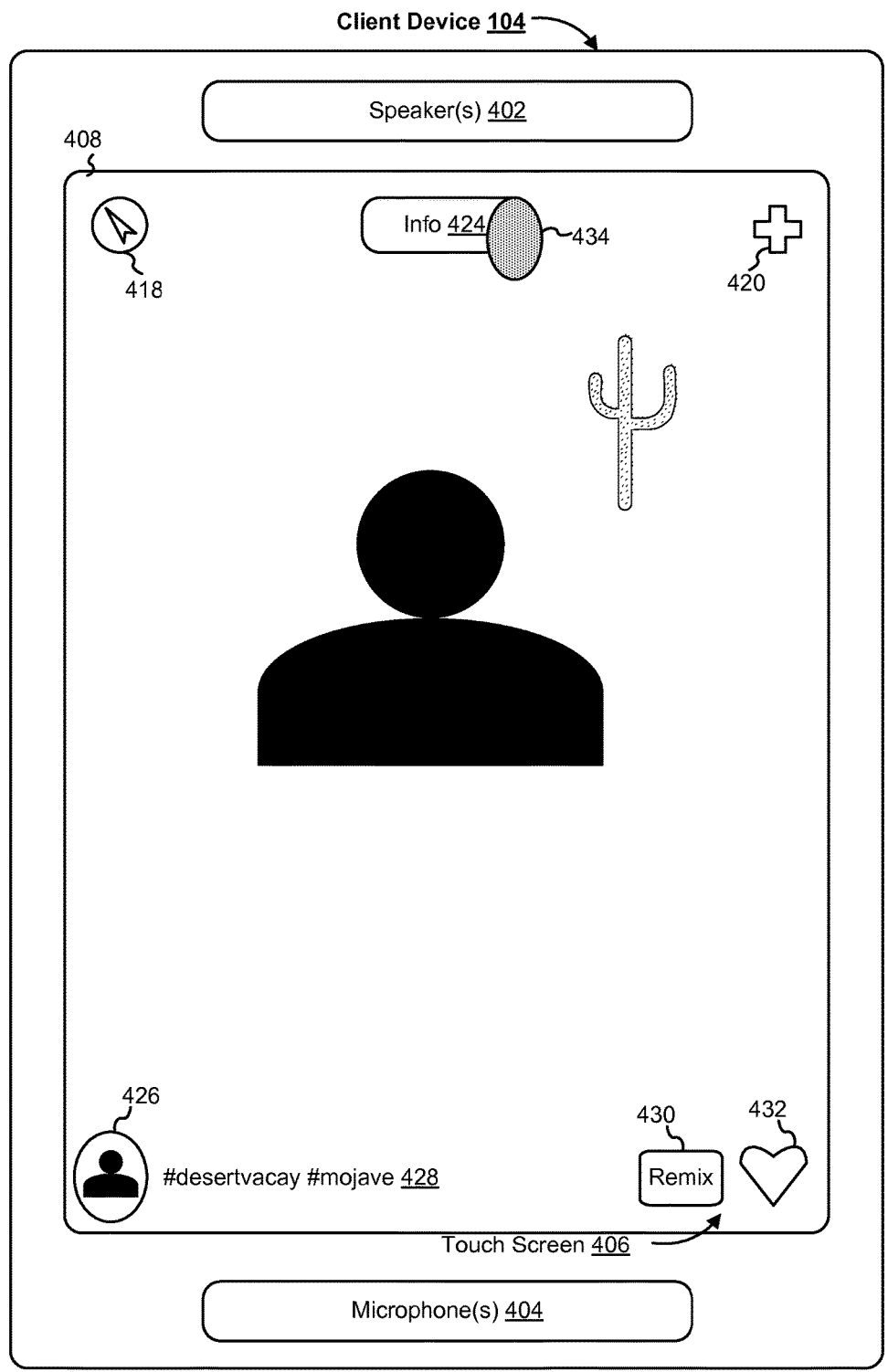

FIG. 4B illustrates client device 104 presenting a respective media item on touch screen 406 that corresponds to media item affordance 410-b in response to detecting contact 422 selecting media item affordance 410-b in FIG. 4A. In FIG. 4B, the user interface includes information affordance 424, which, when activated (e.g., by a touch input from the user), causes client device 104 to display an informational user interface (e.g., the user interface in FIG. 4C) with information and one or more options associated with the respective media item and representation 426, which, when activated (e.g., by a touch input from the user), causes client device 104 to display a profile associated with the author of the respective media item. For example, representation 426 is an image associated with the author of the respective media item (e.g., a headshot or avatar) or an identifier, name, or handle associated with the author of the respective media item. In FIG. 4B, the user interface also includes hashtags 428 associated with the respective media item, remix affordance 430, which, when activated (e.g., by a touch input from the user), causes client device 104 to display a remix panel (e.g., remix options 458 in FIG. 4E) for modifying the respective media item, and like affordance 432, which, when activated (e.g., by a touch input from the user), causes client device 104 to send a notification to server system 108 to update a like field in the metadata structure associated with the respective media item (e.g., likes field 530 in FIG. 5B). For example, in response to receiving the notification, server system 108 or a component thereof (e.g., updating module 322, FIG. 3) updates likes field 530, as shown in FIG. 5B, in a metadata structure associated with the media item to reflect the notification. For example, in response to detecting contact 422 selecting media item affordance 410-b in FIG. 4A, client device 104 sends a notification to server system 108 to update a play count field in the metadata structure associated with the respective media item (e.g., play count field 526 in FIG. 5B). In this example, in response to receiving the notification, server system 108 or a component thereof (e.g., updating module 322, FIG. 3) updates play count field 526, as shown in FIG. 5B, in a metadata structure associated with the media item to reflect the notification. FIG. 4B also illustrates client device 104 detecting contact 434 at a location corresponding to information affordance 424.

In some embodiments, advertisements are concurrently displayed with the respective media item such as banner advertisements or advertisements in a side region of the user interface. In some embodiments, owners of copyrighted audio tracks and video clips upload at least a sample of the audio tracks and video clips to reference database 344 (FIG. 3) associated with the provider of the application. For example, prior to or while presenting the respective media item, server system 108 or a component thereof (e.g., analyzing module 326, FIG. 3) analyzes the one or more audio tracks and one or more video clips associated with the respective media item to determine a digital fingerprint for the one or more audio tracks and one or more video clips. In some embodiments, when server system 108 or a component thereof (e.g., determining module 328, FIG. 3) determines that the digital fingerprint for the one or more audio tracks and one or more video clips associated with the respective media item matches copyrighted audio tracks and/or video clips in reference database 344, server system 108 or a component thereof is configured to share advertising revenue with the owners of copyrighted audio tracks and/or video clips.

Figure 4C:
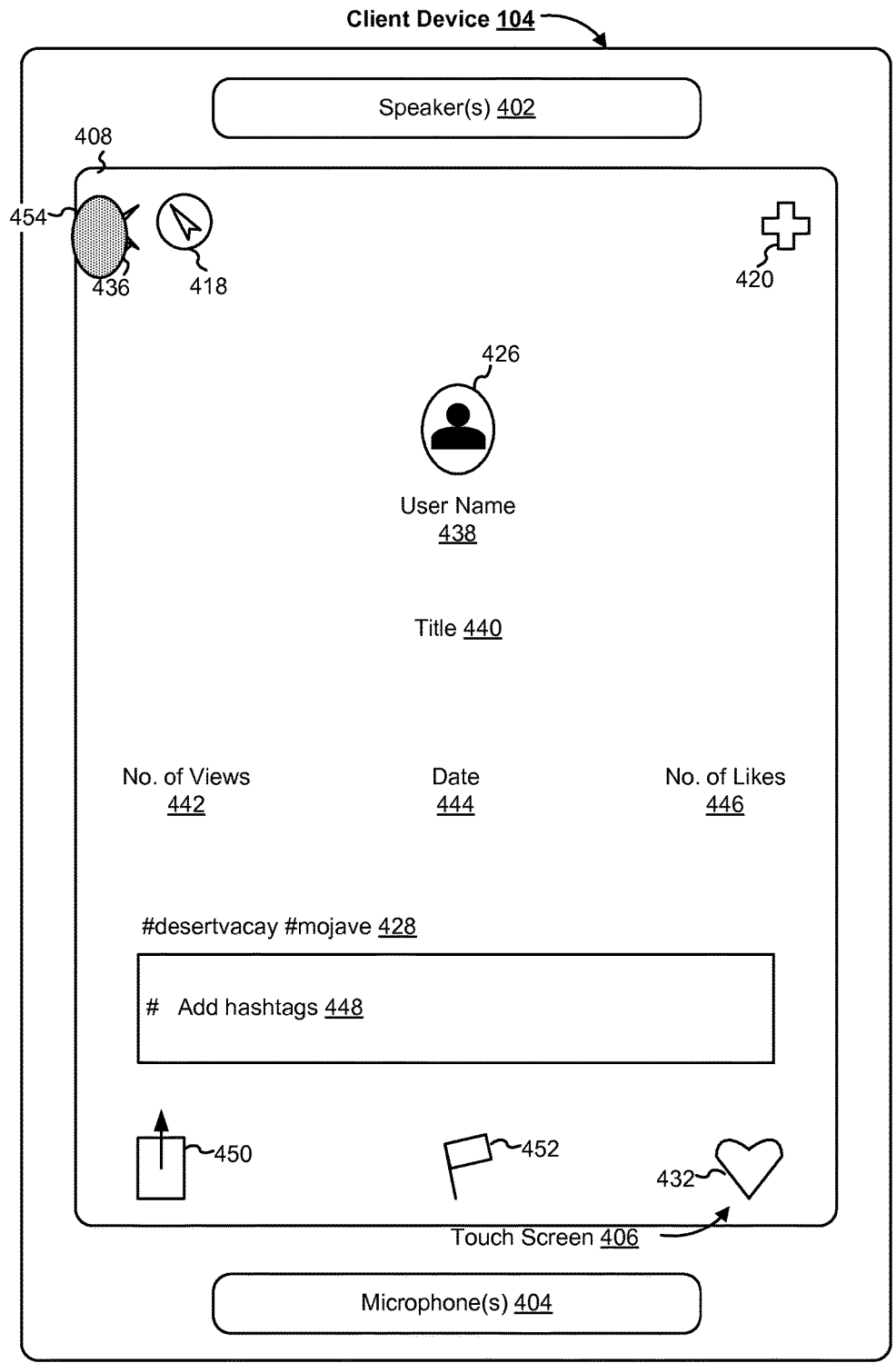

FIG. 4C illustrates client device 104 displaying the informational user interface associated with the respective media item on touch screen 406 in response to detecting contact 434 selecting information affordance 424 in FIG. 4B. In FIG. 4C, the informational user interface comprises information associated with the respective media item, including: representation 426 associated with the author of the respective media item; title 440 of the respective media item; number of views 442 of the respective media item; date/time 444 on which the respective media item was authored; and number of likes 446 of the respective media item. In FIG. 4C, the informational user interface also includes pre-existing hashtags 428 associated with the respective media item and text entry box 448 for adding a comment or hashtag to the respective media item. For example, when a user adds a comment or hashtag, client device 104 sends a notification to server system 108 to update a comment field in the metadata structure associated with the respective media item (e.g., comments field 538 in FIG. 5B). In this example, in response to receiving the notification, server system 108 or a component thereof (e.g., updating module 322, FIG. 3) updates comments field 538, as shown in FIG. 5B, in a metadata structure associated with the media item to reflect the notification.

In FIG. 4C, the informational user interface further includes one or more options associated with the respective media. In FIG. 4C, share affordance 450, when activated (e.g., by a touch input from the user), causes client device 104 to display a sharing panel with a plurality of options for sharing the respective media item (e.g., affordances for email, SMS, social media outlets, etc.), flag affordance 452, when activated (e.g., by a touch input from the user), causes client device 104 to send a notification to server system 108 to flag the respective media item (e.g., for derogatory, inappropriate, or potentially copyrighted content), and like affordance 432, when activated (e.g., by a touch input from the user), causes client device 104 to send a notification to server system 108 to update a like field in the metadata structure associated with the respective media item (e.g., likes field 530 in FIG. 5B). In FIG. 4C, the informational user interface additionally includes back navigation affordance 436, which, when activated (e.g., by a touch input from the user), causes client device 104 to display a previous user interface (e.g., the user interface in FIG. 4B). FIG. 4C also illustrates client device 104 detecting contact 454 at a location corresponding to back navigation affordance 436.

Figure 4D:
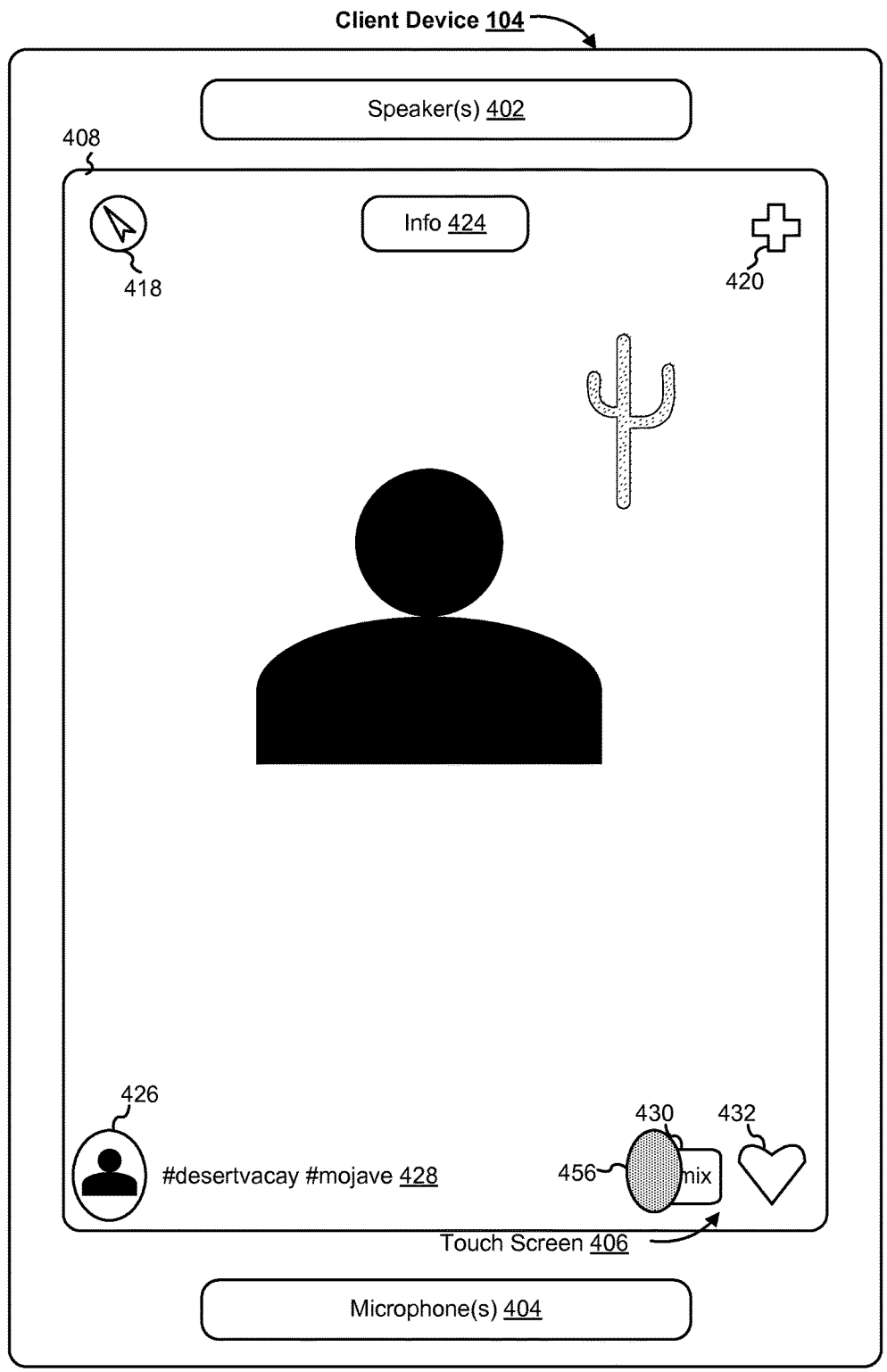

FIG. 4D illustrates client device 104 presenting the respective media item on touch screen 406 that corresponds to media item affordance 410-*b* in response to detecting contact 454 selecting back navigation affordance 436 in FIG. 4C. FIG. 4D also illustrates client device 104 detecting contact 456 at a location corresponding to remix affordance 430.

Figure 4E:
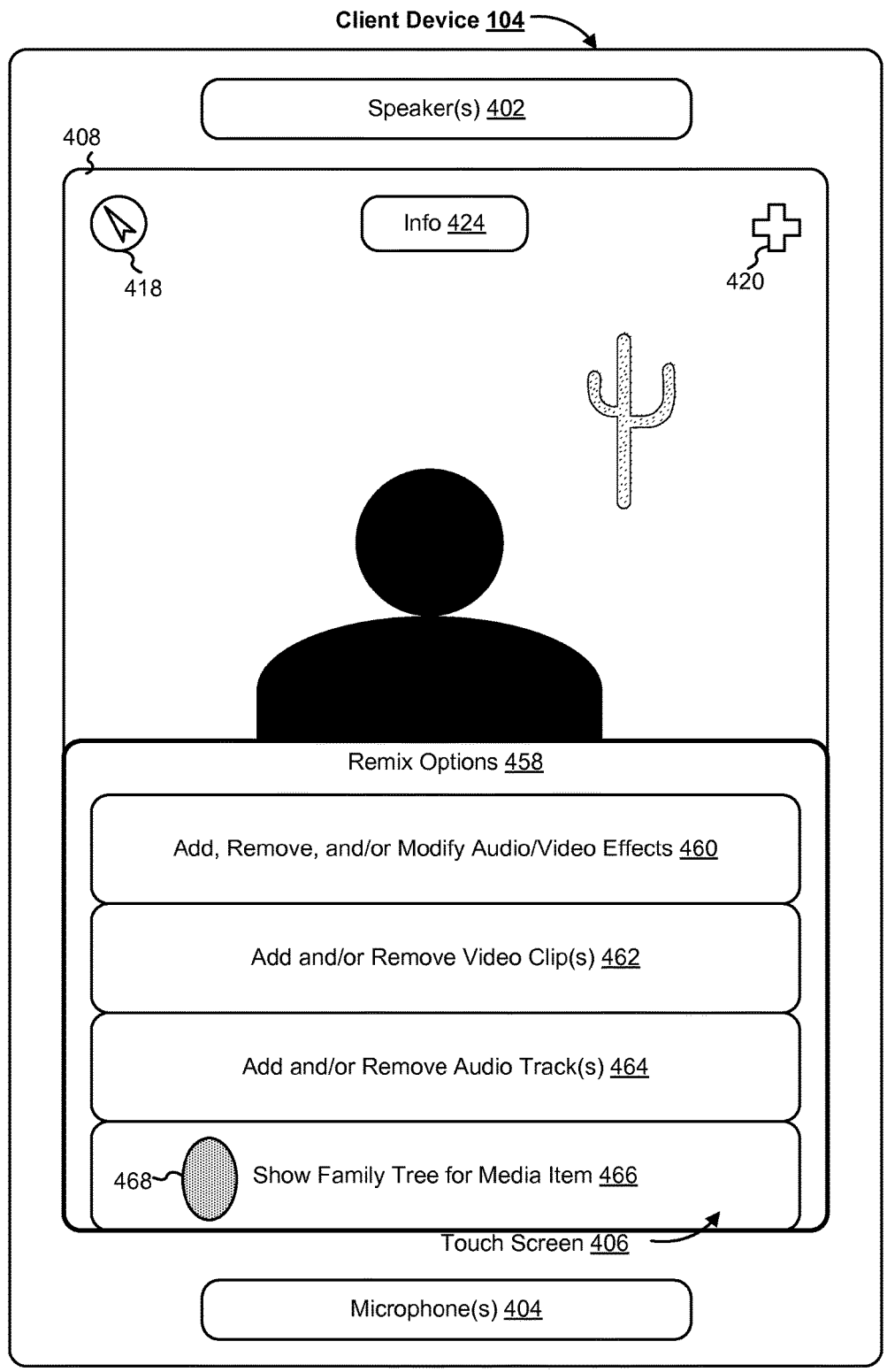

FIG. 4E illustrates client device 104 displaying remix options 458 over the respective media item being presented on touch screen 406 in response to detecting contact 456 selecting remix affordance 430 in FIG. 4D. In FIG. 4E, remix options 458 includes: affordance 460 for adding, removing, and/or modifying audio and/or video effect associated with the respective media item; affordance 462 for adding and/or removing one or more video clips associated with the respective media item; affordance 464 for adding and/or removing one or more audio tracks associated with the respective media item; and affordance 466, which, when activated (e.g., by a touch input from the user), causes client device 104 to display a family tree user interface associated with the respective media item (e.g., the user interface in FIG. 4F). FIG. 4E also illustrates client device 104 detecting contact 468 at a location corresponding to affordance 466.

Alternatively, in some embodiments, in response to detecting contact 456 selecting remix affordance 430 in FIG. 4D, client device 104 enters a remix mode for editing the respective media item. In the remix mode, client device 104 displays a sequence of representations corresponding to the one or more video clips comprising the respective media item. While in the remix mode, the user of client device 104 is able to remove or reorder video clips associated with the respective media item by performing one or more gestures with respect to the representations in the sequence of representations. Furthermore, while in the remix mode, the user of client device 104 is able to shoot one or more additional video clips, apply different audio and/or video effects, and/or change the audio track associated with the respective media item.

Figure 4F:
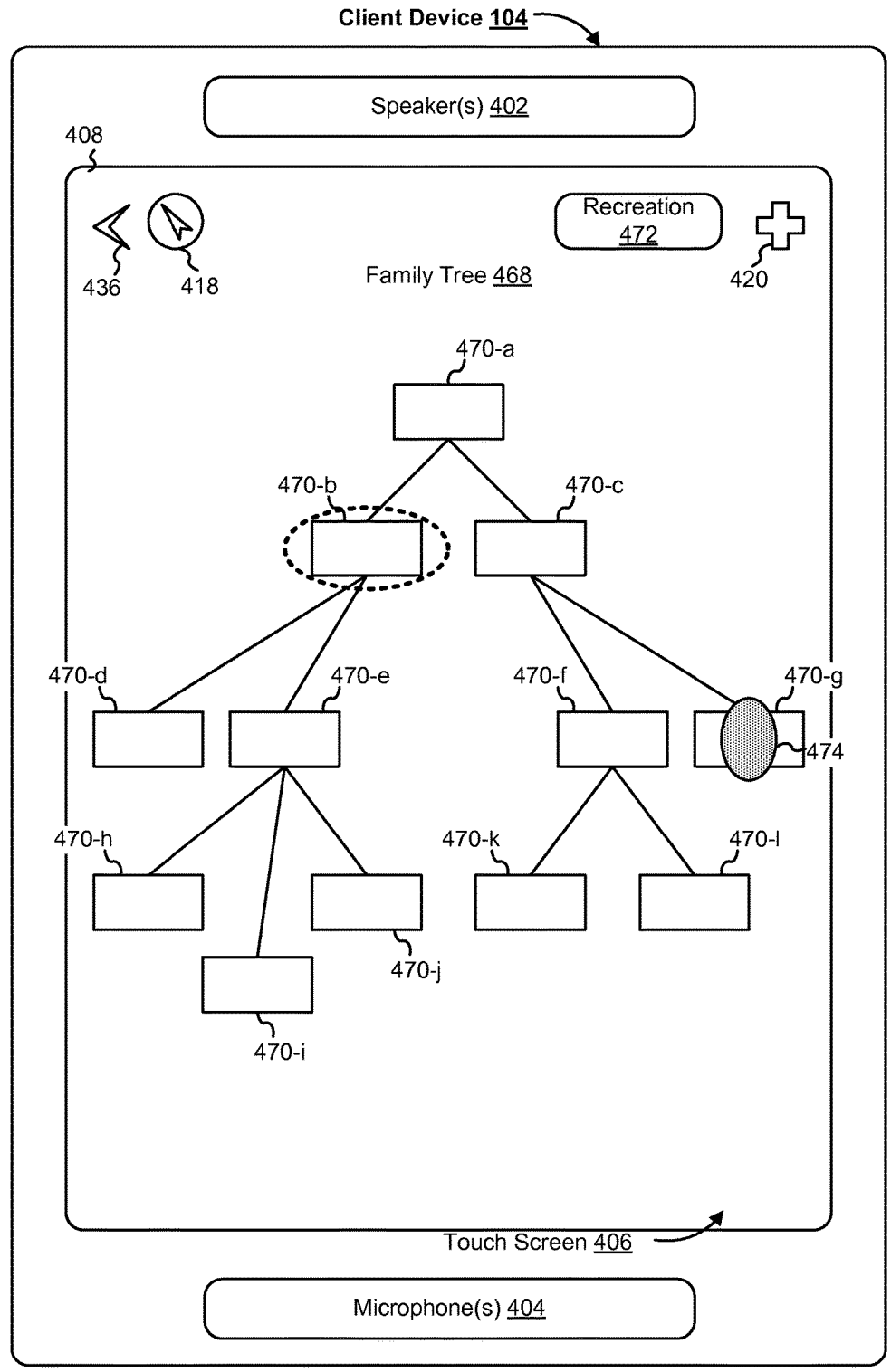

FIG. 4F illustrates client device 104 displaying the family tree user interface associated with the respective media item on touch screen 406 in response to detecting contact 468 selecting affordance 466 in FIG. 4E. In FIG. 4F, the family tree user interface includes family tree 468 associated with the respective media item. In FIG. 4F, family tree 468 includes genesis node (e.g., node 470-*a*) corresponding to a root media item (i.e., the original media item) for family tree 468 and a plurality of leaf nodes (e.g., nodes 470-*b*, 470-*c*, 470-*d*, 470-*e*, 470-*f*, 470-*g*, 470-*h*, 470-*i*, 470-*j*, 470-*k*, and 470-1) corresponding to media items that are modified versions of the root media item. In some embodiments, the user of client device 104 is able to view and/or modify the characteristics associated with any of the nodes in family tree 468 by selecting a node (e.g., with a tap gesture). In FIG. 4F, the dotted oval surrounding node 470-*b* indicates the currently selected node, i.e., node 470-*b* corresponding to the respective media item.

In some embodiments, each of the leaf nodes in family tree 468 are associated with one parent node and zero or more leaf nodes. For example, with respect to node 470-*b* corresponding to the respective media item, genesis node 470-*a* is its parent node and leaf nodes 470-*d* and 470-*e* are its child nodes. In FIG. 4F, the family tree user interface also includes back navigation affordance 436, which, when activated (e.g., by a touch input from the user), causes client device 104 to display a previous user interface (e.g., the user interface in FIG. 4D), navigation affordance 418, which, when activated (e.g., by a touch input from the user), causes client device 104 to display a navigation panel for navigating between user interfaces of the application (e.g., one or more of a feed view, user profile, user media items, friends view, exploration view, settings, and so on), and creation affordance 420, which, when activated (e.g., by a touch input from the user), causes client device 104 to display a first user interface of a process for generating a media item. In FIG. 4F, the family tree user interface further includes recreation affordance 472, which, when activated (e.g., by a touch input from the user), causes client device 104 to present an evolutionary history or a step-by-step recreation of modifications from the genesis node to the currently selected node.

FIG. 4F also illustrates client device 104 detecting contact 474 at a location corresponding to node 470-g.

Figure 4G:
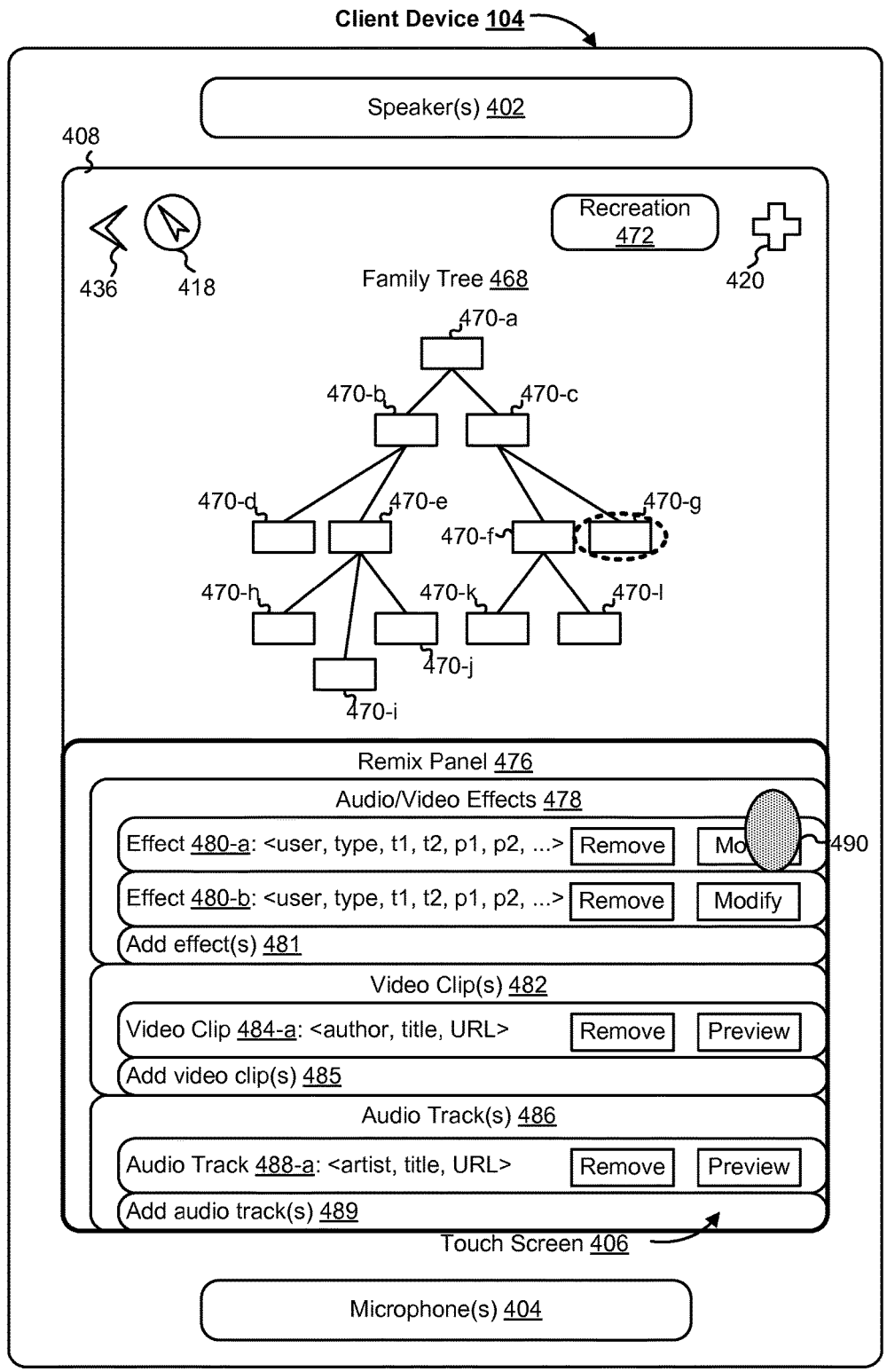

FIG. 4G illustrates client device 104 displaying remix panel 476 in the family tree user interface on touch screen 406 in response to detecting contact 474 selecting node 470-g in FIG. 4F. In FIG. 4G, the dotted oval surrounding node 470-g indicates the currently selected node. In FIG. 4G, remix panel 476 enables the user of client device 104 to view and/or modify the characteristics (e.g., audio and/or video effects, video clip(s), and audio track(s)) of the media item associated with node 470-g. In FIG. 4G, remix panel 476 includes audio and/or video effects region 478, video clip(s) region 482, and audio track(s) region 486. In FIG. 4G, audio and/or video effects region 478 includes affordances for removing or modifying effects 480-a and 480-b associated with the media item corresponding to node 470-g and affordance 481 for adding one or more additional audio and/or video effect to the media item corresponding to node 470-g. In FIG. 4G, video clip(s) region 482 includes affordances for removing or modifying video clip 484-a associated with the media item corresponding to node 470-g and affordance 485 for adding one or more video clips to the media item corresponding to node 470-g. For example, the user of client device 104 is able to shoot one or more additional video clips or select one or more additional pre-existing video clips from a media file source 126 (e.g., YouTube, Vimeo, etc.). In FIG. 4G, audio track(s) region 486 includes affordances for removing or modifying audio track 488-a associated with the media item corresponding to node 470-g and affordance 489 for adding one or more audio tracks to the media item corresponding to node 470-g. For example, the user of client device 104 is able to select one or more additional pre-existing audio tracks from audio library 260 (FIG. 2) and/or a media file source 126 (e.g., SoundCloud, Spotify, etc.). FIG. 4G also illustrates client device 104 detecting contact 490 at a location corresponding to the modify affordance for effect 480-a. For example, in response to detecting contact 490 selecting modify affordance for effect 480-a, the user of client device 104 is able to modify one or more parameters associated with effect 480-a such as the effect type, effect version; the start time (t1) for effect 480-a, the end time (t2) for effect 480-a, and/or one or more preset parameters (p1, p2, . . . ) for effect 480-a.

Alternatively, in some embodiments, in response to detecting contact 474 selecting node 470-g in FIG. 4F, client device 104 enters a remix mode for editing the media item corresponding to node 470-g. In the remix mode, client device presents the media item corresponding to node 470-g and displays a sequence of representations corresponding to the one or more video clips comprising the media item corresponding to node 470-g. While in the remix mode, the user of client device 104 is able to remove or reorder video clips associated with the media item by performing one or more gestures with respect to the representations in the sequence of representations. Furthermore, while in the remix mode, the user of client device 104 is able to shoot one or more additional video clips, apply different audio and/or video effects, and/or change the audio track associated with the media item.

Figure 4H:
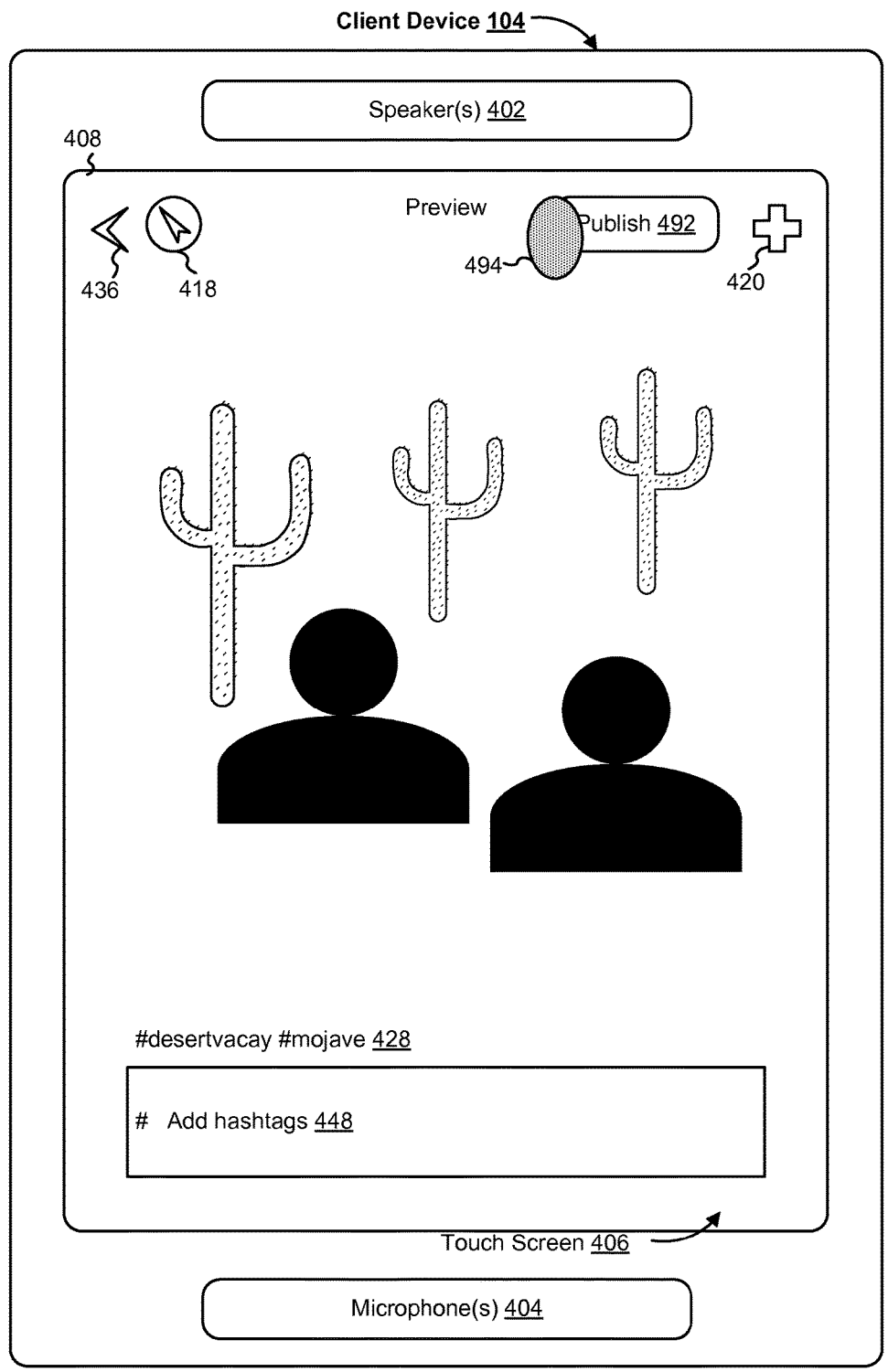

FIG. 4H illustrates client device 104 displaying a preview of the modified media item on touch screen 406 that was created in FIG. 4G from the media item corresponding to node 470-g. In FIG. 4H, the user interface includes back navigation affordance 436, which, when activated (e.g., by a touch input from the user), causes client device 104 to display a previous user interface (e.g., the user interface in FIG. 4G), navigation affordance 418, which, when activated (e.g., by a touch input from the user), causes client device 104 to display a navigation panel for navigating between user interfaces of the application (e.g., one or more of a feed view, user profile, user media items, friends view, exploration view, settings, and so on), and creation affordance 420, which, when activated (e.g., by a touch input from the user), causes client device 104 to display a first user interface of a process for generating a media item. In FIG. 4H, the user interface also includes publish affordance 492, which, when activated (e.g., by a touch input from the user), causes client device 104 to display an updated family tree user interface (e.g., the user interface in FIG. 4I) and to cause the modified media item to be published. FIG. 4H also illustrates client device 104 detecting contact 494 at a location corresponding to publish affordance 492. In some embodiments, client device causes the modified media item to be published by sending, to server system 108, first information identifying the one or more audio tracks (e.g., audio track 488-a) associated with the modified media item, second information identifying one or more media files (e.g., video clip 484-a) associated with the modified media item, and third information identifying the one or more audio and/or video effects (e.g., the modified version of effect 480-a and effect 480-b) associated with the modified media item.

Figure 4I:
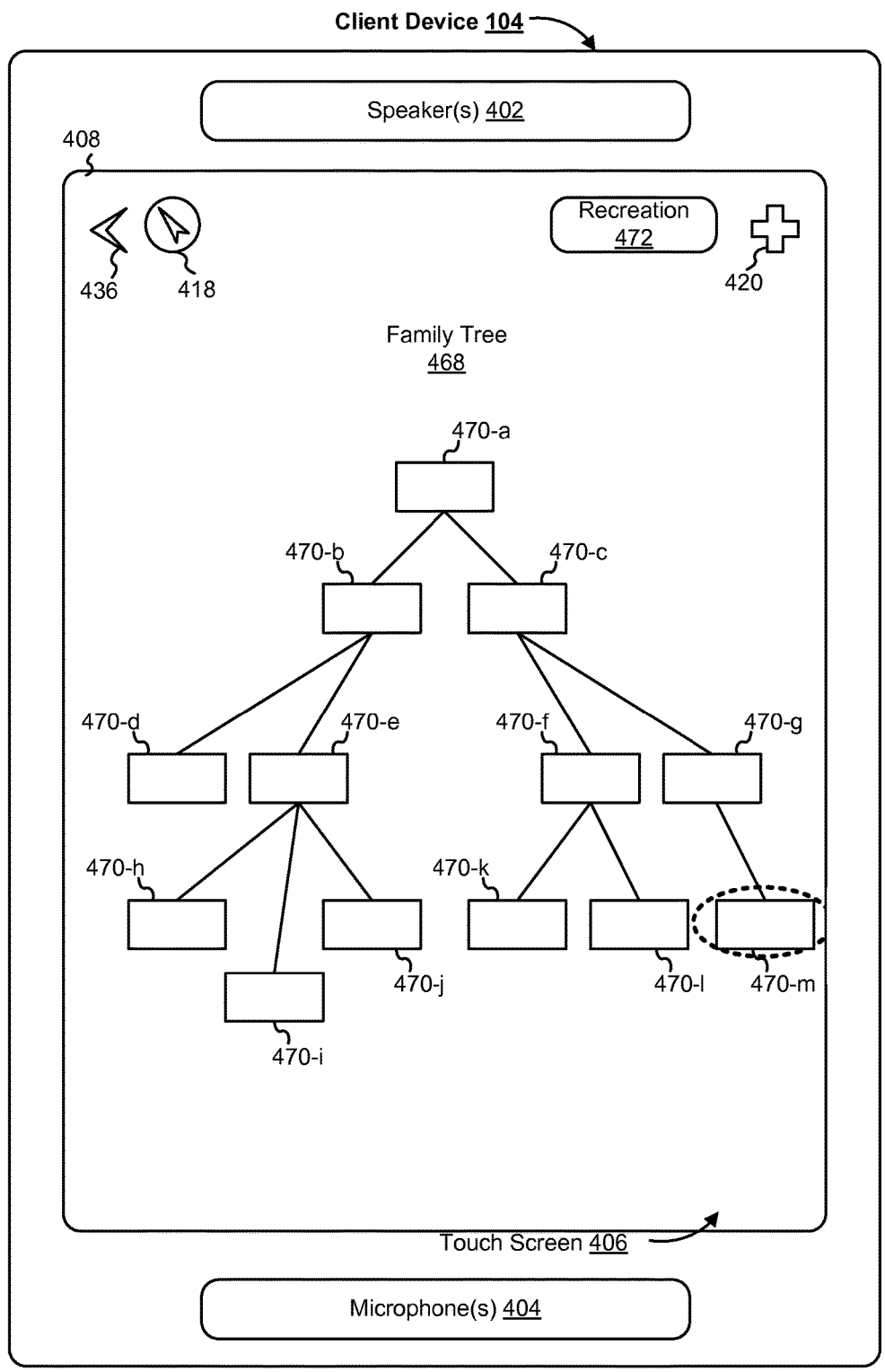

FIG. 4I illustrates client device 104 displaying the updated family tree user interface on touch screen 406 in response to detecting contact 494 selecting publish affordance 492 in FIG. 4H. In FIG. 4I, the dotted oval surrounding node 470-m indicates the currently selected node that corresponds to the modified media item created in FIG. 4G from the media item corresponding to node 470-g. For example, with respect to node 470-m, node 470-g is its parent node and it has no child nodes.

Figure 5A:
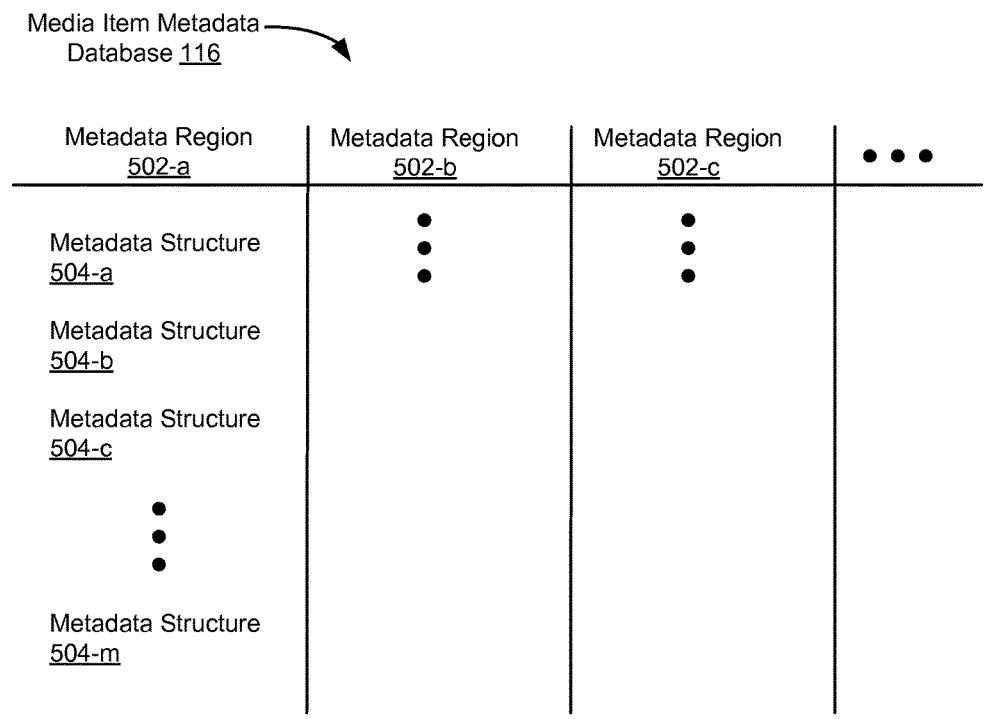
FIG. 5A is a diagram of a media item metadata database in accordance with some embodiments.
Figure 5B:
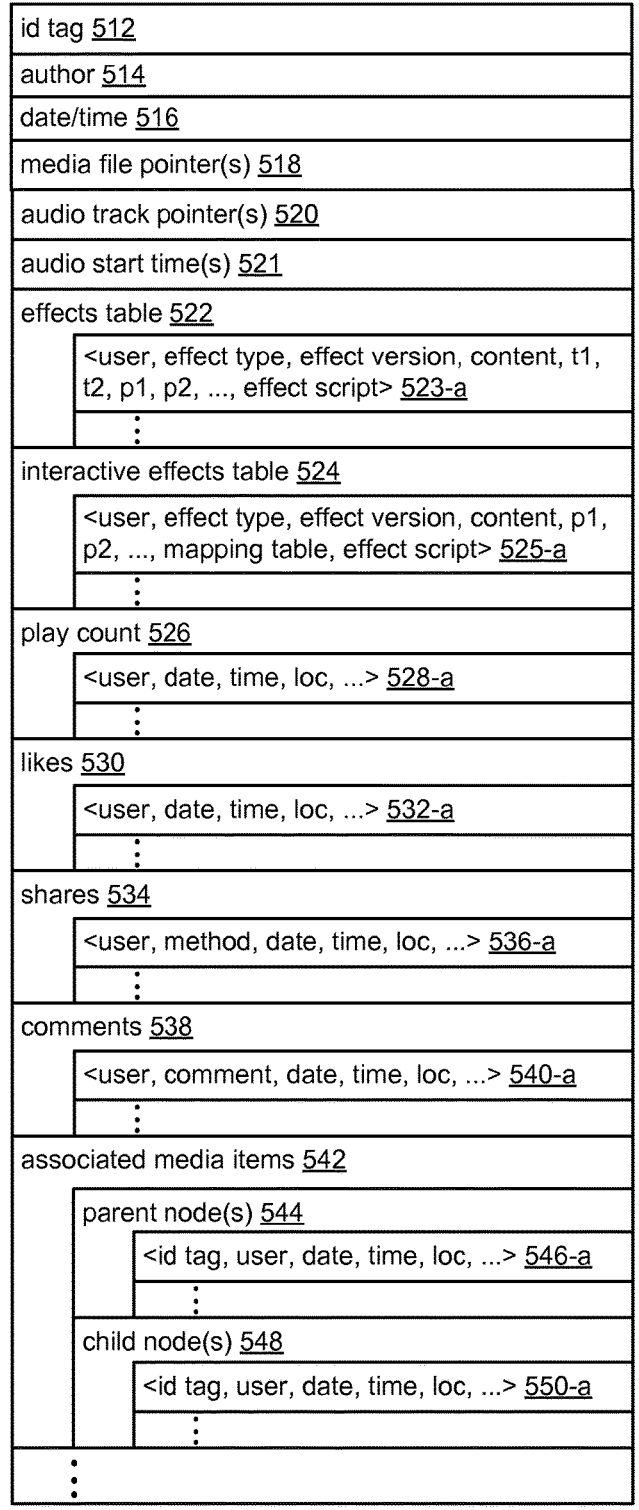
FIG. 5B is a diagram of a representative metadata structure for a respective media item in accordance with some embodiments.

FIG. 5A is a diagram of media item metadata database 116 in accordance with some embodiments. In some embodiments, media item metadata database 116 is maintained by server system 108 or a component thereof (e.g., maintaining module 320, FIG. 3) and stores a metadata structure for each media item generated by a user in the community of users of the application. In some embodiments, media item metadata database 116 is divided into a plurality of metadata regions 502. In some embodiments, each metadata region 502 is associated with a root media item (e.g., an original media item) and includes a family tree for the root media item. In some embodiments, a respective family tree (e.g., family tree 468, FIG. 4I) is composed of a genesis node (e.g., node 470-a, FIG. 4I) corresponding to the root media item and a plurality of leaf nodes (e.g., nodes 470-b, 470-c, 470-d, 470-e, 470-f, 470-g, 470-h, 470-i, 470-j, 470-k, 470-1, and 470-m, FIG. 4I) corresponding to media items that are modified versions of the root media item. To this end, each metadata region 502 includes a metadata structure for each node in the family tree to which it is associated. For example, metadata region 502-a, in FIG. 5A is associated with family tree 468 in FIG. 4I. In this example, metadata structures 504-a . . . 504-m in metadata region 502-a correspond to each of the nodes in family tree 468 (i.e., nodes 470-a . . . 470-m). One of ordinary skill in the art will appreciate that media item metadata database 116 can be arranged in various other ways.

FIG. 5B is a diagram of representative metadata structure 510 for a respective media item in accordance with some embodiments. For example, in response to receiving information from a client device indicating that a user of the client device has generated a new media item (e.g., the respective media item), server system 108 generates metadata structure 510. In some embodiments, the received information at least includes first information identifying one or more audio tracks associated with the respective media item and second information identifying one or more media files (e.g., video clips or images) associated with the respective media item. In some embodiments, the received information, optionally, includes third information identifying one or more audio and/or video effects associated with the respective media item. In some embodiments, metadata structure 510 is stored in media item metadata database 116, as shown in FIGS. 1 and 3, and maintained by server system 108 or a component thereof (e.g., maintaining module 320, FIG. 3).

Metadata structure 510 includes a plurality of entries, fields, and/or tables including a subset or superset of the following:

- identification tag field 512 includes a unique identifier for the respective media item;
- author field 514 includes the identifier, name, or handle associated with the creator/author of the respective media item;
- date/time field 516 includes a date and/or time stamp associated with generation of the respective media item;
- one or more media file pointer fields 518 including a pointer or link (e.g., a URL) for each of the one or more media files (e.g., video clips or images) associated with the respective media item;
- one or more audio track pointer fields 520 for each of the one or more audio tracks associated with the respective media item;
- one or more start time fields 521 for each of the one or more audio tracks associated with the respective media item;
- effects table 522 includes an entry 523 for each of zero or more audio and/or video effects to be applied to the respective media item at run-time upon playback by a subsequent viewer, for example, entry 523-a includes one or more of: the identifier, name, or handle associated with the user who added the effect; the effect type; the effect version; the content (e.g., one or more media files and/or audio tracks) subjected to the effect; a start time (t1) for the effect; an end time (t2) for the effect; one or more preset parameters (p1, p2, . . . ) for the effect; a table mapping interactive input modalities to effect parameters; and an effect script or computer-readable instructions for the effect (e.g., GLSL);
- interactive effects table 524 includes an entry 525 for each of zero or more interactive audio and/or video effects to be controlled and manipulated at run-time by a subsequent viewer of the respective media item, for example, the entry 525-a includes one or more of: the identifier, name, or handle associated with the user who added the interactive effect; the interactive effect type; the interactive effect version; the content (e.g., one or more media files and/or audio tracks) subjected to the effect; one or more parameters (p1, p2, . . . ) for the interactive effect; and an effect script or computer-readable instructions for the interactive effect (e.g., GLSL);
- play count field 526 includes zero or more entries 528 for each play back of the respective media item, for example, entry 528-a includes: the identifier, name, or handle associated with the user who played the respective media item; the date and time when the respective media item was played; and the location where the respective media item was played;
- likes field 530 includes zero or more entries 532 for each like of the respective media item, for example, entry 532-a includes: the identifier, name, or handle associated with the user who liked the respective media item; the date and time when the respective media item was liked; and the location where the respective media item was liked;
- shares field 534 includes zero or more entries 536 for each share of the respective media item, for example, entry 536-a includes: the identifier, name, or handle associated with the user who shared the respective media item; the method by which the respective media item was shared; the date and time when the respective media item was shared; and the location where the respective media item was shared;
- comments field 538 includes zero or more entries 540 for each comment (e.g., a hashtag) corresponding to the respective media item, for example, entry 540-a includes: the comment; the identifier, name, or handle associated with the user who authored the comment; the date and time when the comment was authored; and the location where the comment was authored; and
- associated media items field 542 includes zero or more entries in a parent node sub-field 544 and zero or more entries in a child node sub-field 548 for each media item associated with the respective media item, for example:
  - parent node sub-field 544 includes entry 546-a corresponding to a parent media item associated with the respective media item that includes: an identification tag for the parent media item; the identifier, name, or handle associated with the user who authored the parent media item; the date and time when the parent media item was authored; and the location where the parent media item was authored; and
  - child node sub-field 548 includes entry 550-a corresponding to a child media item associated with the respective media item that includes: an identification tag for the child media item; the identifier, name, or handle associated with the user who authored the child media item; the date and time when the child media item was authored; and the location where the child media item was authored.

In some implementations, metadata structure 510, optionally, stores a subset of the entries, fields, and/or tables identified above. Furthermore, metadata structure 510, optionally, stores additional entries, fields, and/or tables not described above.

In some embodiments, identification tag field 512 includes a node type identifier bit that is set for root media items/genesis nodes and unset for leaf nodes. In some embodiments, a parent or child node entry in a metadata structure links to a node in a different family tree (and, ergo, metadata region). In this way, in some embodiments, metadata structures are included in more than one metadata region as a node is linked to more than one family tree. In some embodiments, effect parameters include, but are not limited to: (x,y) position and scale of audio and/or video effects, edits, specification of interactive parameters, and so on.

For example, metadata structure 510 is metadata structure 504-b in FIG. 5A, which corresponds to a respective media item in the family tree associated with metadata region 502-a. In this example, the family tree associated with metadata region 502-a is family tree 468 in FIG. 4I, and the node corresponding to metadata structure 504-b is node 470-b. Continuing with this example, associated media items field 542 includes entry 546-a corresponding to node 470-a in parent node sub-field 544 and entries 550-a and 550-b corresponding to nodes 470-d and 470-e in child node sub-field 548.

Figure 6A:
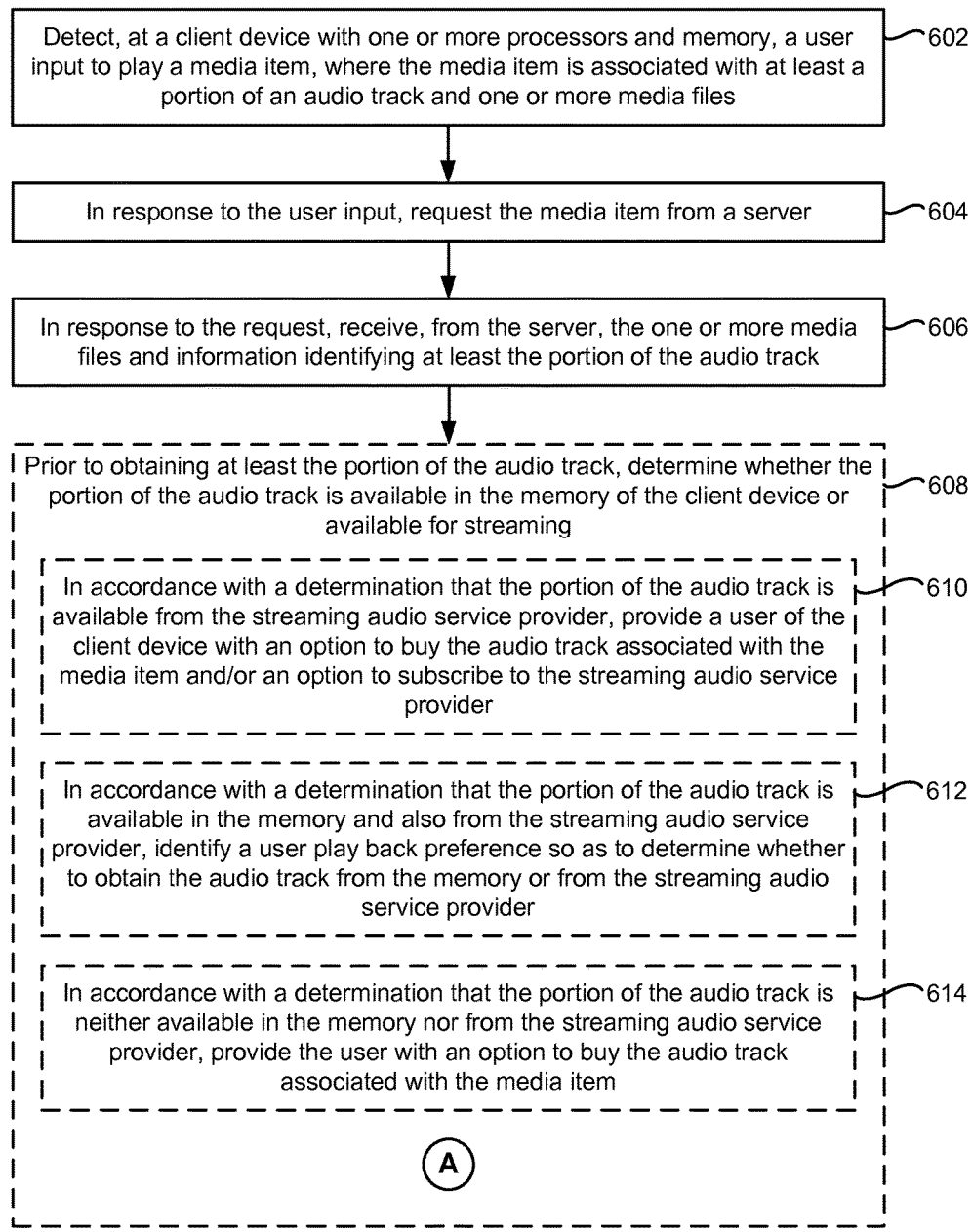
FIGS. 6A-6C illustrate a flowchart representation of a client-side method of presenting a media item in accordance with some embodiments.
Figure 6B:
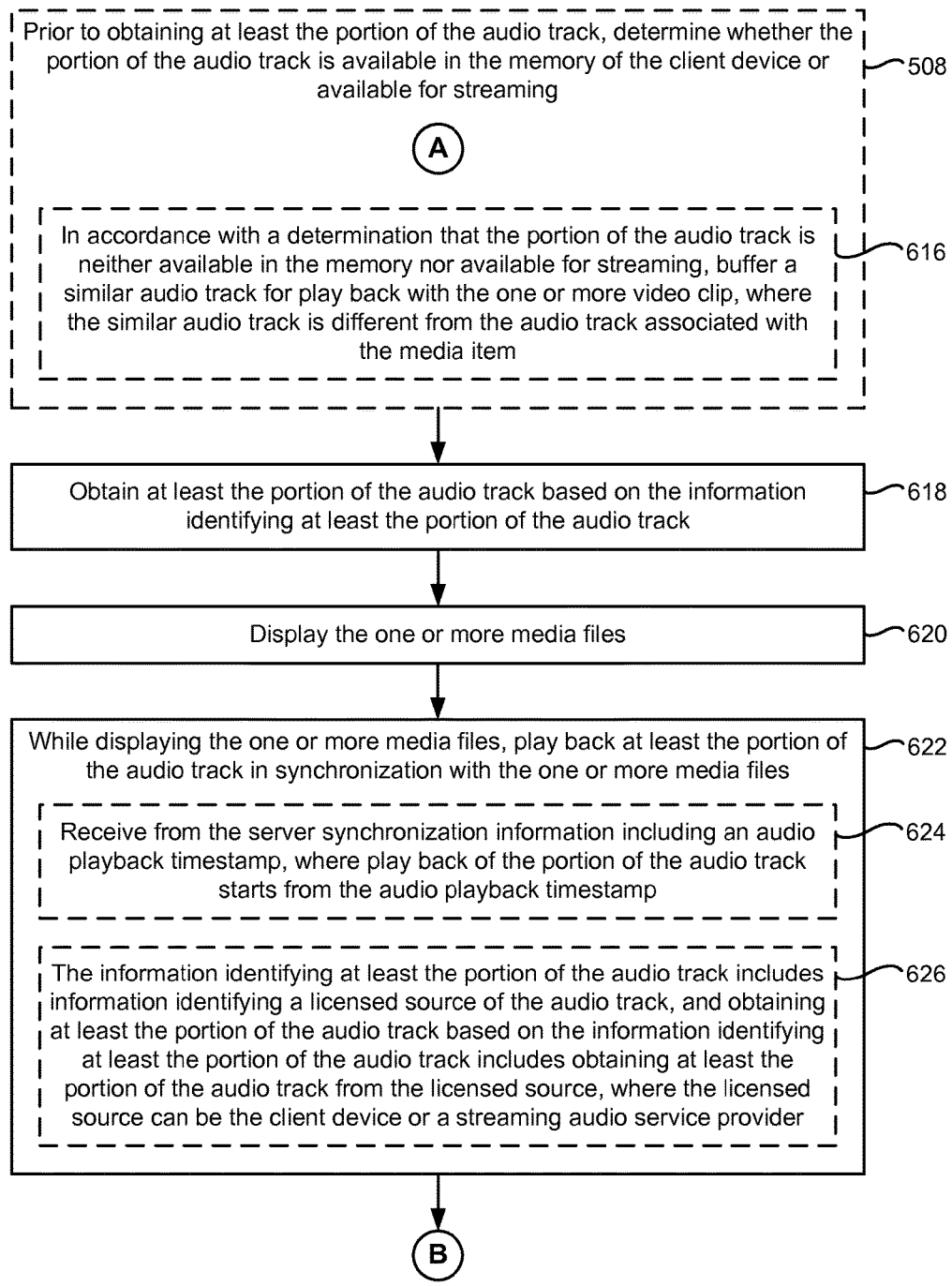
Figure 6C:
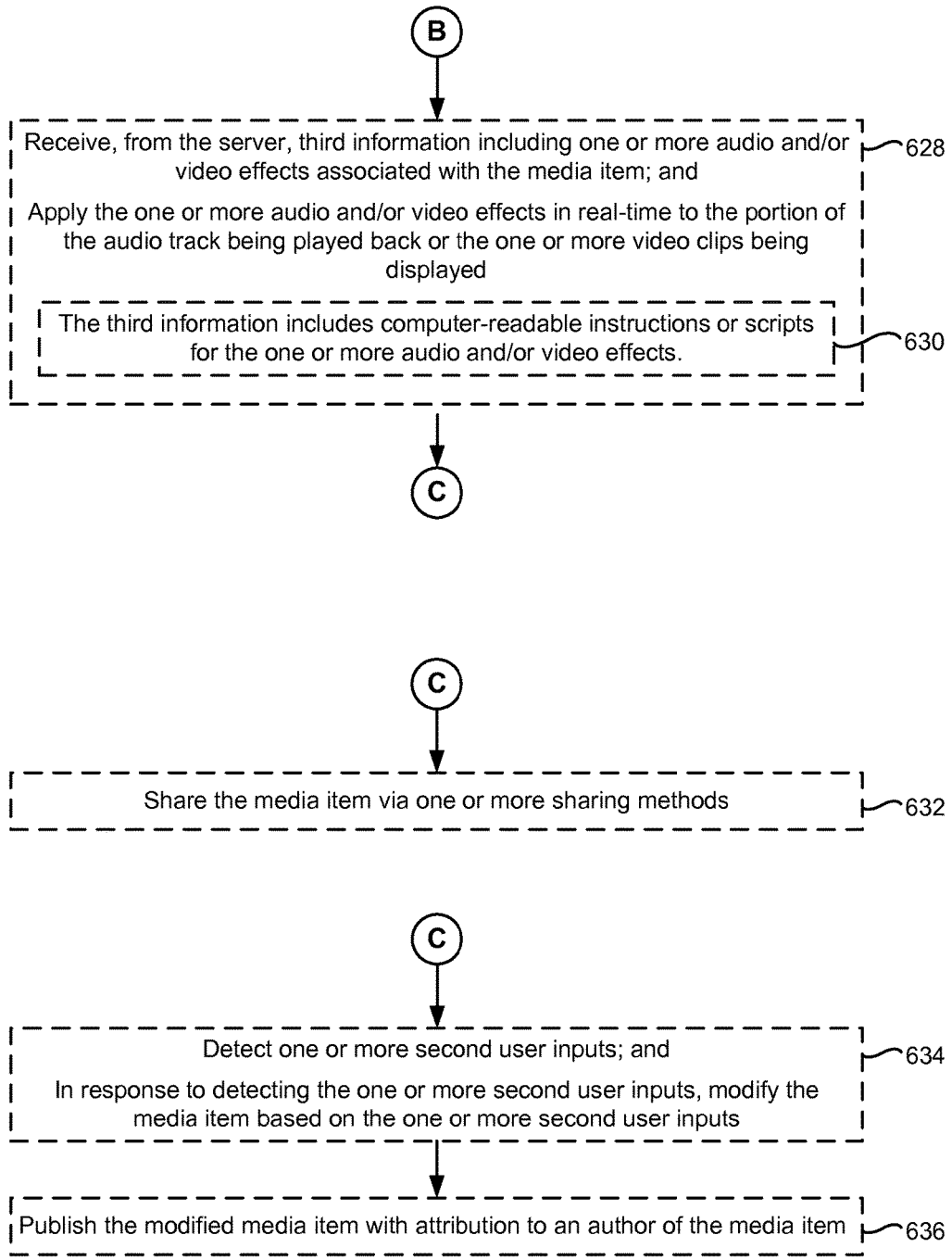

FIGS. 6A-6C illustrate a flowchart diagram of a client-side method 600 of presenting a media item in accordance with some embodiments. In some embodiments, method 600 is performed by an electronic device with one or more processors and memory. For example, in some embodiments, method 600 is performed by a mobile device (e.g., client device 104, FIGS. 1-2) or a component thereof (e.g., client-side module 102, FIGS. 1-2). In some embodiments, method 600 is governed by instructions that are stored in a non-transitory computer readable storage medium and the instructions are executed by one or more processors of the electronic device. Optional operations are indicated by dashed lines (e.g., boxes with dashed-line borders).

The client device detects (602) a user input to play the media item, where the media item is associated with at least a portion of an audio track and one or more media files (e.g., one or more video clips and/or a sequence of one or more images). For example, in FIG. 4A, client device 104 detects contact 422 at a location corresponding to media item affordance 410-b to play the media item associated with media item affordance 410-b. In some other embodiments, the media item is only associated with audio or video and the application generates the missing media content (e.g., audio or video content). For example, the media item is associated with at least a portion of an audio track and the application is configured to present a visualizer that is synchronized with the portion of the audio track or to match one or more video clips or a sequence of one or more images to the portion of the audio track to be synchronized with the portion of the audio track.

In response to the user input, the client device requests (604) the media item from a server. For example, in response to detecting contact 422, in FIG. 4A, at a location corresponding to media item affordance 410-b, client device 104 sends a request to server system 108 requesting the media item that corresponds to media item affordance 410-b.

In response to the request, the client device receives (606), from the server, the one or more media files and information identifying at least the portion of the audio track. In some embodiments, client device 104 receives, from server system 108, one or more media files associated with the requested media item and a metadata structure, or a portion thereof, associated with the requested media item (e.g., including information identifying at least a portion of an audio track associated with the requested media item). In some embodiments, client device 104 buffers the one or more media files received from server system 108 in video buffer 254 (FIG. 2) for display. In some embodiments, client device 104 receives, from server system 108, a metadata structure, or a portion thereof, associated with the requested media item (e.g., including information identifying one or more media files associated with the requested media item and information identifying at least a portion of an audio track associated with the requested media item). In some embodiments, a metadata structure associated with the media item is stored in media item metadata database 116 (FIGS. 1 and 3) at server system 108. In some embodiments, the metadata structure associated with the media item includes a pointer to each of one or more media files associated with the media item and a pointer to each of one or more audio tracks associated with the media item. In some embodiments, a respective pointer to a media file associated with the media item points to a media file stored in media file database 114 or available from a media file source 126 (FIG. 1). In some embodiments, a respective pointer to an audio track associated with the media item points to an audio track stored in audio library 260 (FIG. 2) associated with the user of client device 104 or provided by an audio source 124 (FIG. 1) (e.g., a streaming audio service provider such as Spotify, SoundCloud, Rdio, Pandora, or the like).

In some embodiments, prior to obtaining at least the portion of the audio track, the client device determines (608) whether the portion of the audio track is available in the memory of the client device or available for streaming (e.g., from a streaming audio service provider such as SoundCloud, Spotify, Rdio, etc.). In some embodiments, client device 104 or a component thereof (e.g., determining module 230, FIG. 2) determines whether the audio track identified in the metadata structure corresponding to the media item is available in audio library 260 (FIG. 2) and/or from one or more audio sources 124 (FIG. 1).

In some embodiments, in accordance with a determination that the portion of the audio track is available from the streaming audio service provider, the client device provides (610) a user of the client device with an option to buy the audio track associated with the media item and/or an option to subscribe to the streaming audio service provider. In some embodiments, after client device 104 or a component thereof (e.g., determining module 230, FIG. 2) determines that the audio track identified in the metadata structure for the media item is available from an audio source 124 (FIG. 1), client device 104 additionally presents the user of client device 104 with the option to buy the audio track and/or to subscribe to the audio source 124 from which the audio track is available. In some embodiments, upon presenting the media item, client device 104 presents the user of client device 104 with the option to buy the audio track and/or to subscribe to the audio source 124 from which the audio track is available.

In some embodiments, in accordance with a determination that the portion of the audio track is available in the memory and also from the streaming audio service provider, the client device identifies (612) a user play back preference so as to determine whether to obtain the audio track from the memory or from the streaming audio service provider. In some embodiments, after client device 104 or a component thereof (e.g., determining module 230, FIG. 2) determines that the audio track identified in the metadata structure for the media item is available both in audio library 260 (FIG. 2) and from one or more audio sources 124 (FIG. 1), client device 104 identifies a play back preference in user profile 262 (FIG. 2). For example, when the play back preference in user profile 262 indicates that audio library 260 (FIG. 2) is the default, client device 104 plays back at least the portion of the audio track from audio library 260 in synchronization with the one or more media files. For example, when the play back preference in user profile 262 indicates that streaming audio is the default, client device 104 plays back at least the portion of the audio track from audio source 124 in synchronization with the one or more media files.

In some embodiments, in accordance with a determination that the portion of the audio track is neither available neither in the memory nor from the streaming audio service provider, the client device provides (614) a user of the client device with an option to buy the audio track associated with the media item. In some embodiments, after client device 104 or a component thereof (e.g., determining module 230, FIG. 2) determines that the audio track identified in the metadata structure for the media item is neither available in audio library 260 (FIG. 2) nor from one or more audio sources 124 (FIG. 1), client device 104 presents the user of client device 104 with the option to buy the audio track from an audio track marketplace (e.g., Amazon, iTunes, etc.).

In some embodiments, in accordance with a determination that the portion of the audio track is neither available in the memory nor available for streaming, the client device buffers (616) a similar audio track for play back with the one or more media files, where the similar audio track is different from the audio track associated with the media item. In some embodiments, as a contingency for when the audio track is unavailable, the metadata structure associated with the media item optionally includes information identifying one or more audio tracks that are similar to the audio track associated with the media item. For example, the similar audio track is a cover of the audio track associated with the media item or has a similar music composition (e.g., similar genre, artist, instruments, notes, key, rhythm, and so on) to the audio track associated with the media item. In some embodiments, after client device 104 or a component thereof (e.g., determining module 230, FIG. 2) determines that the audio track identified in the metadata structure for the media item is neither available in audio library 260 (FIG. 2) nor from one or more audio sources 124 (FIG. 1), client device 104 obtains at least a portion of a similar audio track from a source (e.g., audio library 260 or an audio source 124) and buffers at least the portion of the similar audio track in audio buffer 252 (FIG. 2) for play back.

The client device obtains (618) at least the portion of the audio track based on the information identifying at least the portion of the audio track. In some embodiments, after determining a source for the audio track (e.g., audio library 260 (FIG. 2) or an audio source 124 (FIG. 1)), client device 104 or a component thereof (e.g., obtaining module 232, FIG. 2) obtains at least the portion of the audio track from the identified source and buffers at least the portion of the audio track in audio buffer 252 (FIG. 2) for play back.

The client device displays (620) the one or more media files. For example, in FIG. 4B, client device 104 or a component thereof (e.g., presenting module 234, FIG. 2) displays on touch screen 406 one or more media files associated with the media item that corresponds to media item affordance 410-*b* selected in FIG. 4A.

While displaying the one or more media files, the client device plays back (622) at least the portion of the audio track in synchronization with the one or more media files. In some embodiments, client device 104 or a component thereof (e.g., presenting module 234, FIG. 2) plays back, via one or more speakers 402, at least a portion of an audio track associated with the media item. In some embodiments, client device 104 or a component thereof (e.g., synchronizing module 236, FIG. 2) synchronizes play back of the portion of the audio track with display of the one or more media items.

In some embodiments, the client device receives (624), from the server, synchronization information including an audio playback timestamp, where play back of the portion of the audio track starts from the audio playback timestamp. In some embodiments, client device 104 or a component thereof (e.g., synchronizing module 236, FIG. 2) synchronizes play back of the portion of the audio track with display of the one or more media items by starting play back of the portion of the audio track from the audio playback timestamp identified in the synchronization information (e.g., audio start time field 521, FIG. 5B).

In some embodiments, the information identifying at least the portion of the audio track includes (626) information identifying a licensed source of the audio track, and obtaining at least the portion of the audio track based on the information identifying at least the portion of the audio track includes obtaining at least the portion of the audio track from the licensed source, where the licensed source can be the client device or a streaming audio service provider. In some embodiments, the audio track is recorded or provided by a user in the community of user associated with the application. In some embodiments, the licensed source is audio library 260 (FIG. 2), which contains one or more audio tracks purchased by the user of client device 104, or an audio source 124 (e.g., a streaming audio service provider such as SoundCloud, Spotify, or the like) with licensing rights to the audio track.

In some embodiments, the client device receives (628), from the server, third information including one or more audio and/or video effects associated with the media item, and the client device applies the one or more audio and/or video effects in real-time to the portion of the audio track being played back or the one or more video clips being displayed. In some embodiments, the one or more audio and/or video effects are static, predetermined effects that are stored in effects table 522 in a metadata structure 510, as shown in FIG. 5B, and the one or more audio and/or video effects are applied to the one or more media files and/or the portion of the audio track at run-time. In some embodiments, the one or more audio and/or video effects are interactive effects that are stored in interactive effects table 524 in a metadata structure 510, as shown in FIG. 5B, and the user of client device 104 controls and manipulates the application of one or more audio and/or video interactive effects to the one or more media files and/or the portion of the audio track in real-time upon play back. Storage of the audio and/or video effects in effects table 522 and/or interactive effects table 524 enables the application to maintain original, first generation media files and audio tracks in an unadulterated and high quality form and to provide an unlimited modification functionality (e.g., remix and undo).

In some embodiments, the third information includes (630) computer-readable instructions or scripts for the one or more audio and/or video effects. For example, client device 104 downloads effects, from server system 108, at run-time including computer-readable instructions or scripts for the effects written in a language such as GLSL, accompanied by effect metadata indicating effect type, effect version, effect parameters, a table mapping interactive modalities (e.g., touch, gesture, sound, vision, etc.) to effect parameters, and so on. In this way, the choice, number, and type of effect can be varied at run-time. In some embodiments, a web-based content management server (CMS) is available for the real-time browser-based authoring and uploading of effects to the server, including real-time preview of effects on video and/or audio (e.g., using technologies such as WebGL). In some embodiments, the audio and/or video effects have interactive components that can specified and customized by authors via the CMS, and then be controlled and manipulated at run-time via user inputs.

In some embodiments, the client device shares (632) the media item via one or more sharing methods. For example, share affordance 450, in FIG. 4C, causes client device 104 to display a sharing panel with a plurality of options for sharing the respective media item (e.g., affordances for email, SMS, social media outlets, etc.). In this example, in response to detecting a user input selecting one of the options in the sharing panel, client device 104 sends, to server system 108, a command to share the media item presented in FIG. 4B. Continuing with this example, in response to receiving the command, server system 108 causes a link to the media item to be placed on a profile page in social media application corresponding to the user of client device 104. In some embodiments, server system 108 or a component thereof (e.g., modifying module 330, FIG. 3) generates a flattened version of the media item by combining the one or more audio tracks, one or more video clips, and zero or more effects associated with the media item into a single stream or digital media item. In some embodiments, the link placed on the profile page in social media application corresponds to the flattened version of the media item for web browsers.

In some embodiments, sharing the media item is accomplished by a specialized web player that recreates a subset of the functions of the application and runs in a web browser, such as some combination of: synchronizing audio and video streams from different sources during playback; applying real-time effects; allowing interaction with the player; allowing sharing and re-sharing of the media item on social networks or embedded in web pages, etc.

In some embodiments, the client device detects (634) one or more second user inputs, and, in response to detecting the one or more second user inputs, the client device modifies the media item based on the one or more second user inputs. For example, client device 104 detects one or more second user inputs selecting affordance 464, in FIG. 4E, to add and/or remove one or more audio tracks associated with the media item presented in FIGS. 4B and 4D that corresponds to affordance 410-*b*. In this example, the user of client device selects a cover audio track from audio library 260 (FIG. 2) or an audio source 124 (FIG. 1) to replace the audio track associated with the media item. In some embodiments, this requires that the server system determine a corresponding start time (synchronization information) for the cover audio track. Continuing with this example, client device 104 creates a modified media item based on the media item presented in FIGS. 4B and 4D that corresponds to affordance 410-*b*.

In some embodiments, the client device publishes (636) the modified media item with attribution to an author of the media item. In some embodiments, in response to one or more second user inputs modifying the media item presented in FIGS. 4B and 4D that corresponds to affordance 410-*b*, client device 104 publishes the modified media item by sending, to server system 108, first information identifying the one or more audio tracks associated with the modified media item (e.g., the selected cover of the audio track associated with the media item presented in FIGS. 4B and 4D), second information identifying one or more media files associated with the modified media item, and third information identifying the one or more audio and/or video effects associated with the modified media item. In some embodiments, attribution is given to an author of individual new or modified media items and metadata. For example, with reference to FIG. 5B, each entry 523 in effects table 522 includes the identifier, name, or handle associated with the user who added the effect.

Figure 7A:
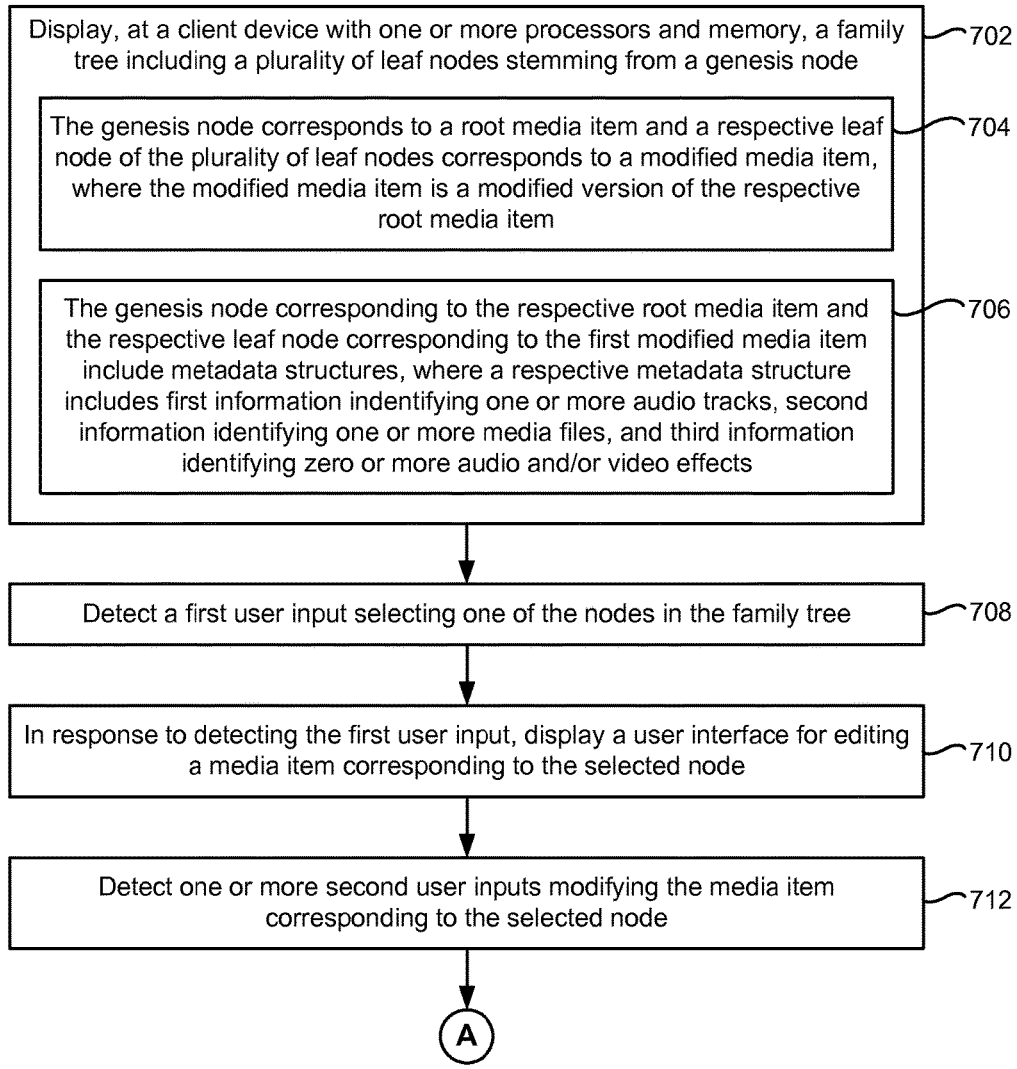
FIGS. 7A-7B illustrate a flowchart representation of a client-side method of modifying a pre-existing media item in accordance with some embodiments.
Figure 7B:
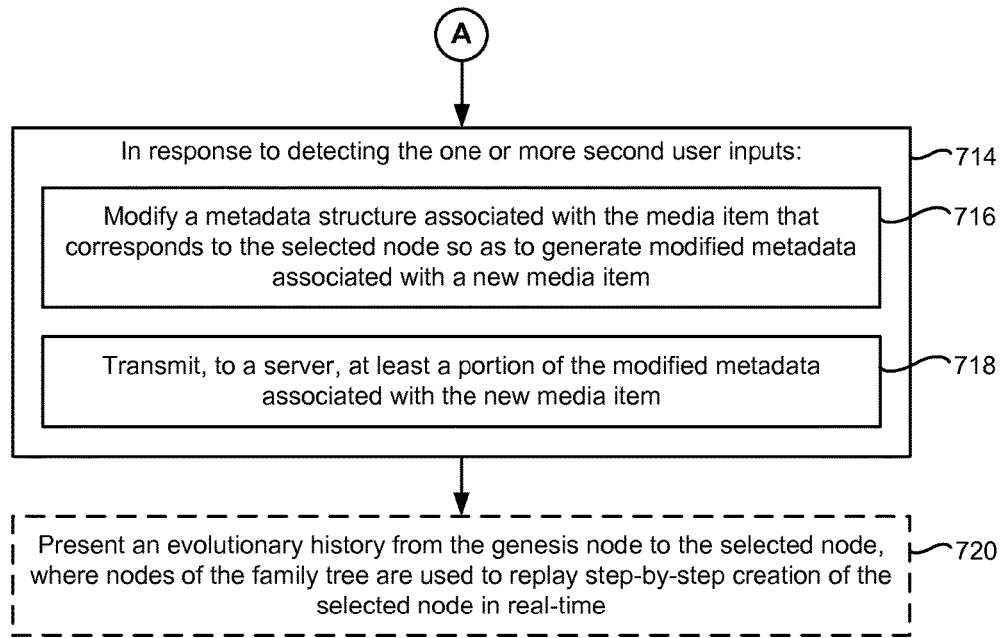

FIGS. 7A-7B illustrate a flowchart diagram of a client-side method 700 of modifying a pre-existing media item in accordance with some embodiments. In some embodiments, method 700 is performed by an electronic device with one or more processors and memory. For example, in some embodiments, method 700 is performed by a mobile device (e.g., client device 104, FIGS. 1-2) or a component thereof (e.g., client-side module 102, FIGS. 1-2). In some embodiments, method 700 is governed by instructions that are stored in a non-transitory computer readable storage medium and the instructions are executed by one or more processors of the electronic device. Optional operations are indicated by dashed lines (e.g., boxes with dashed-line borders).

The client device displays (702) a family tree associated with a root media item including a plurality of leaf nodes stemming from a genesis node. FIG. 4F, for example, shows client device 104 displaying family tree 468 with genesis node 470-*a* and a plurality of leaf nodes 470-*b*, 470-*c*, 470-*d*, 470-*e*, 470-*f*, 470-*g*, 470-*h*, 470-*i*, 470-*j*, 470-*k*, and 470-*l*. In some embodiments, the root media item is a professionally created video (e.g., a music video, film clip, or advertisement) either in "flat" format or in the metadata-annotated format with media items and metadata.

The genesis node corresponds to (704) a root media item and a respective leaf node of the plurality of leaf nodes corresponds to a modified media item, where the modified media item is a modified version of the respective root media item. In FIG. 4F, for example, genesis node 470-*a* corresponds to a root media item (i.e., the original media item) for family tree 468 and leaf nodes 470-*b*, 470-*c*, 470-*d*, 470-*e*, 470-*f*, 470-*g*, 470-*h*, 470-*i*, 470-*j*, 470-*k*, and 470-*l* correspond to media items that are modified versions of the root media item.

The genesis node corresponding to (706) the root media item and the respective leaf node corresponding to the first modified media item include metadata structures, where a respective metadata structure includes first information identifying one or more audio tracks, second information identifying one or more media files, and third information identifying zero or more audio and/or video effects. In some embodiments, media item metadata database 116 stores a metadata structure for each media item generated by a user in the community of users of the application. For example, metadata region 502-*a* of media item metadata database 116, in FIG. 5A, corresponds to family tree 468, and metadata structures 504-*a*, . . . , 504-*m* corresponds to nodes 470-*a*, . . . , 470-*m* of family tree 468 in FIG. 5I. In this example, metadata structure 510, in FIG. 5B, corresponds to metadata structure 504-*b* in FIG. 5A, which corresponds to a respective media item in the family tree associated with metadata region 502-*a*. Continuing with this example, the family tree associated with metadata region 502-*a* is family tree 468 in FIG. 4I, and the node corresponding to metadata structure 504-*b* is node 470-*b*. Metadata structure 510, in FIG. 5B, includes one or more audio track pointer fields 520 for each of the one or more audio tracks associated with the media item, one or more media file pointer fields 520 for each of the one or more media files associated with the media item, and effects table 522 with entries 523 for each of zero or more audio and/or video effects to be applied to the respective media item at run-time.

The client device detects (708) a first user input selecting one of the nodes in the family tree. For example, in FIG. 4F, client device 104 detects contact 474 selecting node 470-*g* in family tree 468. Alternatively, in some embodiments, client device 104 detects a first user input to modify or remix a media item, where the family tree is not displayed or otherwise visualized. For example, with respect to FIG. 4D, client device 104 detects contact 456 selecting remix affordance 430 to modify the respective media item being presented in FIGS. 4B and 4D.

In response to detecting the first user input, the client device displays (710) a user interface for editing a media item corresponding to the selected node. For example, in FIG. 4G, client device 104 displays remix panel 476 in the family tree user interface in response to detecting contact 474 selecting node 470-*g* in FIG. 4F. For example, remix panel 476 enables the user of client device 104 to re-order, add, or remove one or more audio tracks and/or one or more video clips associated with the media item corresponding to node 470-g, or to add, remove, or modify one or more audio and/or video effects associated with the media item corresponding to node 470-g.

The client device detects (712) one or more second user inputs modifying the media item corresponding to the selected node. For example, in response to detecting contact 490, in FIG. 4G, selecting modify affordance for effect 480-a, the user of client device 104 is able to modify one or more parameters associated with effect 480-a such as the effect type, the effect version, the start time (t1) for effect 480-a, the end time (t2) for effect 480-a, and/or one or more preset parameters (p1, p2, . . . ) for effect 480-a.

In response to detecting the one or more second user inputs (714), the client device modifies (716) a metadata structure associated with the media item that corresponds to the selected node so as to generate modified metadata associated with a new media item. For example, in response to detecting the one or more second user inputs modifying one or more parameters associated with effect 480-a, client device 104 or a component thereof (e.g., modifying module 242, FIG. 2) modifies an entry corresponding to effect 480-a in the effects table of the metadata structure for node 470-g so as to generate modified metadata associated with a new media item.

In response to detecting the one or more second user inputs (714), the client device transmits (718), to a server, at least a portion of the modified metadata associated with the new media item. In some embodiments, in response to detecting the one or more second user inputs modifying one or more parameters associated with effect 480-a, client device 104 or a component thereof (e.g., publishing module 244, FIG. 2) transmits at least a portion of the modified metadata to server system 108. For example, after modifying a pre-existing media item corresponding to node 470-g in family tree 468, in FIG. 4G, so as to generate a new media item, client device 104 publishes the new media item by sending, to server system 108, first information identifying the one or more audio tracks associated with the new media item (e.g., audio track 488-a), second information identifying one or more media files associated with the new media item (e.g., video clip 484-a), and third information identifying the one or more audio and/or video effects of associated with the new media item (e.g., modified effect 480-a and effect 480-b).

In some embodiments, the client device presents (720) an evolutionary history from the genesis node to the selected node, where nodes of the family tree are used to replay step-by-step creation of the selected node in real-time. For example, with respect to FIG. 4I, client device detects a user input selecting recreation affordance 472. In this example, in response to detecting the user input selecting recreation affordance 472, client device 104 presents an evolutionary history or a step-by-step recreation of modifications from the genesis node (e.g., node 470-a) to the currently selected node (e.g., node 470-m).

Figure 8A:
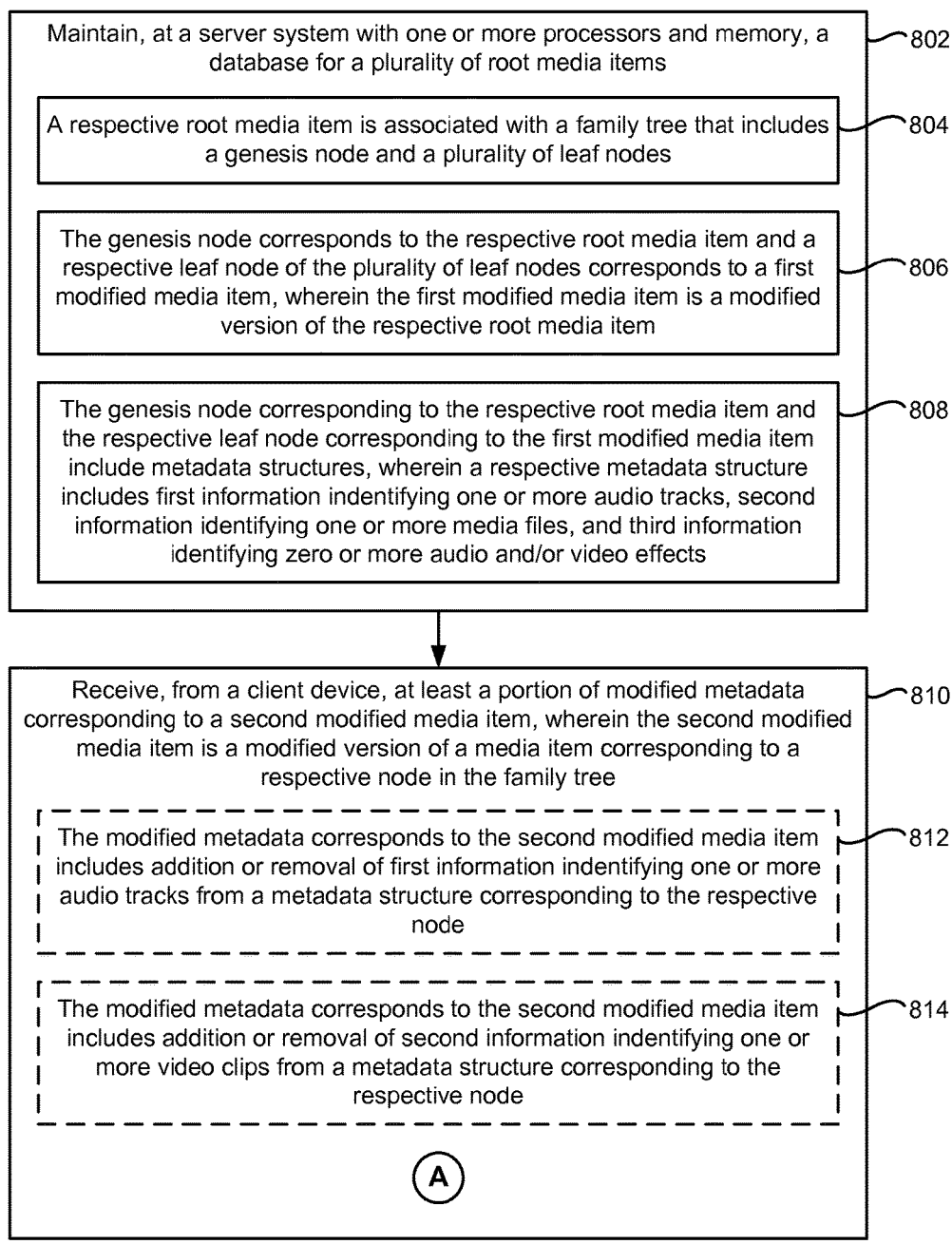
FIG. 8A-8B illustrate a flowchart representation of a server-side method of maintaining a database in accordance with some embodiments.
Figure 8B:
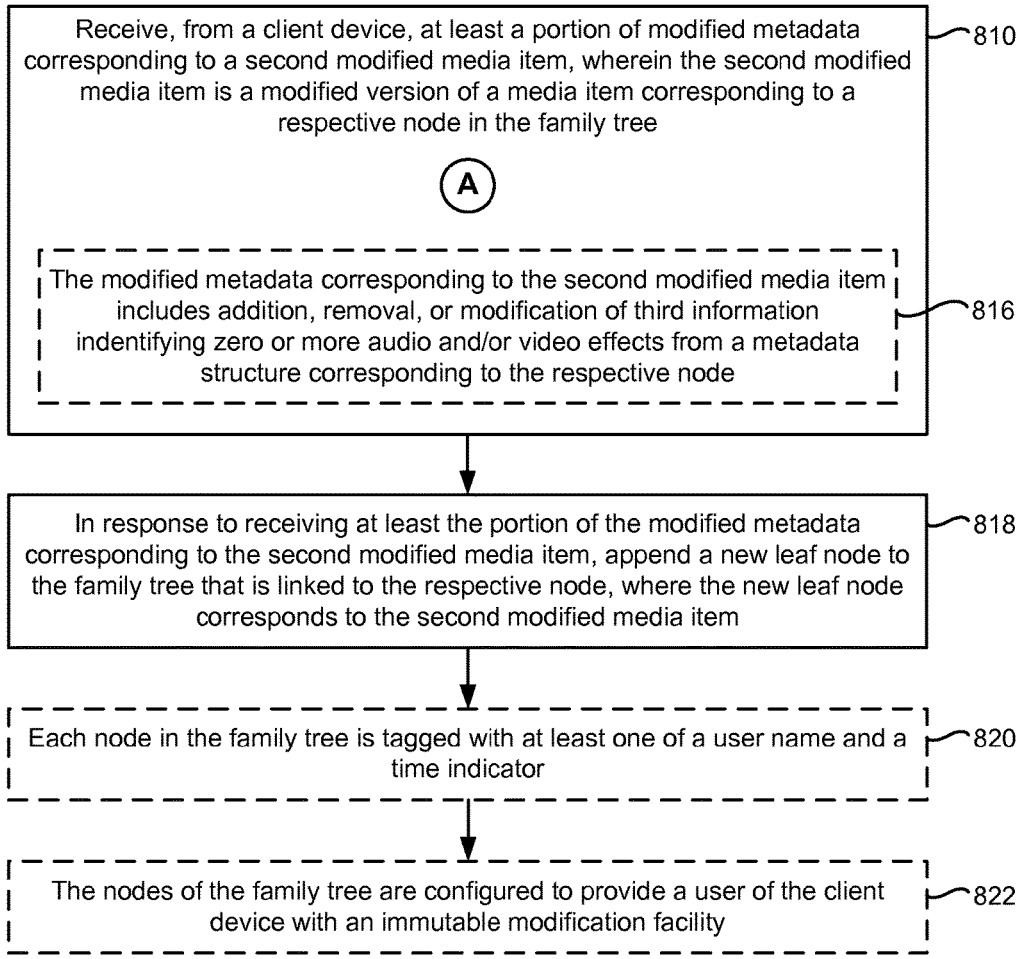

FIGS. 8A-8B illustrate a flowchart diagram of a server-side method 800 of maintaining a database in accordance with some embodiments. In some embodiments, method 800 is performed by an electronic device with one or more processors and memory. For example, in some embodiments, method 800 is performed by a server (e.g., server system 108, FIGS. 1 and 3) or a component thereof (e.g., server-side module 106, FIGS. 1 and 3). In some embodiments, method 800 is governed by instructions that are stored in a non-transitory computer readable storage medium and the instructions are executed by one or more processors of the electronic device. Optional operations are indicated by dashed lines (e.g., boxes with dashed-line borders).

The server maintains (802) a database for a plurality of root media items. In some embodiments, server system 108 or a component thereof (e.g., maintaining module 320, FIG. 3) maintains media item metadata database 116 for a plurality of root media items. In some embodiments, media item metadata database 116 stores a metadata structure for each media item generated by a user in the community of users of the application. In FIG. 5A, for example, each of metadata regions 502 correspond to a root media item and include metadata structures for the root media item and modified versions of the root media item that comprise a family tree of the root media item.

A respective root media item is associated with (804) a family tree that includes a genesis node and a plurality of leaf nodes. For example, family tree 468, in FIG. 4I, includes genesis node 470-a, which corresponds to the root media item, and a plurality of leaf nodes 470-b, 470-c, 470-d, 470-e, 470-f, 470-g, 470-h, 470-i, 470-j, 470-k, and 470-l. In some embodiments, the root media item is a professionally created video (e.g., a music video, film clip, or advertisement) either in "flat" format or in the metadata-annotated format with media items and metadata.

The genesis node corresponds to (806) the respective root media item and a respective leaf node of the plurality of leaf nodes corresponds to a first modified media item, where the first modified media item is a modified version of the respective root media item. In FIG. 4I, for example, genesis node 470-a corresponds to a root media item (i.e., the original media item) for family tree 468 and leaf nodes 470-b, 470-c, 470-d, 470-e, 470-f, 470-g, 470-h, 470-i, 470-j, 470-k, 470-l, and 470-m correspond to media items that are modified versions of the root media item.

The genesis node corresponding to the respective root media item and the respective leaf node corresponding to the first modified media item include (808) metadata structures, where a respective metadata structure includes first information identifying one or more audio tracks, second information identifying one or more media files, and third information identifying zero or more audio and/or video effects. For example, metadata region 502-a of media item metadata database 116, in FIG. 5A, corresponds to family tree 468, and metadata structures 504-a . . . 504-m corresponds to nodes 470-a . . . 470-m of family tree 468 in FIG. 5I. In this example, the family tree associated with metadata region 502-a is family tree 468 in FIG. 4I, and the node corresponding to metadata structure 504-b is node 470-b. Continuing with this example, metadata structure 510, in FIG. 5B, corresponds to metadata structure 504-b in FIG. 5A, and metadata structure 510 includes one or more audio track pointer fields 520 for each of the one or more audio tracks associated with the media item, one or more media file pointer fields 520 for each of the one or more media files associated with the media item, and effects table 522 with entries 523 for each of zero or more audio and/or video effects to be applied to the respective media item at run-time.

The server receives (810), from a client device, at least a portion of a modified metadata corresponding to a second modified media item, where the second modified media item is a modified version of a media item corresponding to a respective node in the family tree (e.g., adding or removing audio/video, or adding, removing, or modifying audio and/or video effects associated with the respective node). For example, server system 108 or a component thereof (e.g., receiving module 314, FIG. 3) receives at least a portion of modified metadata associated with a new media item created in response to client device 104 detecting the one or more second user inputs (e.g., including contact 490 in FIG. 4G) modifying one or more parameters associated with effect 480-*a* of the media item corresponding to node 470-*g*. In this example, the portion of the modified metadata includes first information identifying the one or more audio tracks associated with the new media item (e.g., audio track 488-*a*), second information identifying one or more media files associated with the new media item (e.g., video clip 484-*a*), and third information identifying the one or more audio and/or video effects of associated with the new media item (e.g., modified effect 480-*a* and effect 480-*b*).

In some embodiments, the modified metadata corresponding to the second modified media item includes (812) addition or removal of first information identifying one or more audio tracks from a metadata structure corresponding to the respective node. In some embodiments, the first information in the modified metadata associated with the new media item includes additional audio tracks or ceases to include audio tracks in comparison to the first information in the metadata structure associated with the media item that corresponds to the respective node (e.g., node 470-*g* in FIG. 4G).

In some embodiments, the modified metadata corresponding to the second modified media item includes (814) addition or removal of second information identifying one or more media files from a metadata corresponding to the respective node. In some embodiments, the second information in the modified metadata structure associated with the new media item includes additional video clips or ceases to include video clips in comparison to the second information in the metadata structure associated with the media item that corresponds to the respective node (e.g., node 470-*g* in FIG. 4G).

In some embodiments, the modified metadata corresponding to the second modified media item includes (816) addition, removal, or modification of third information identifying zero or more audio and/or video effects from a metadata structure corresponding to the respective node. In some embodiments, the third information in the modified metadata associated with the new media item includes additional audio and/or video effects, ceases to include audio and/or video effects, or includes modified audio and/or video effects in comparison to the third information in the metadata structure associated with the media item that corresponds to the respective node (e.g., node 470-*g* in FIG. 4G).

In response to receiving at least the portion of the modified metadata corresponding to the second modified media item, appends (818), to the family tree, a new leaf node that is linked to the respective node, where the new leaf node corresponds to the second modified media item. For example, in response to receiving the portion of the modified metadata, server system 108 or a component thereof (e.g., generating module 324, FIG. 3) generates a metadata structure for the new media item and appends a new node associated with the new media item to a corresponding family tree. For example, node 470-*m* corresponding to the new media item is appended to family tree 468 as shown in FIG. 4I, and metadata structure 504-*m* corresponding to the new media item is added to metadata region 502-*a* in FIG. 5A.

In some embodiments, each node in the family tree is tagged (820) with at least one of a user name and a time indicator (e.g., a date/time stamp). For example, metadata structure 510, in FIG. 5B, corresponds to metadata structure 504-*b* in FIG. 5A and includes author field 514 with the identifier, name, or handle associated with the creator/author of metadata structure 510 and date/time field 516 with a date and/or time stamp associated with generation of metadata structure 510.

In some embodiments, each media item and metadata field in the metadata structure corresponding to the media item is tagged with at least one of a user name and a time indicator. In this way, an attribution history may be stored and displayed to users for the purposes of entertainment, community building, copyright attribution, monetization, advertising, or other reasons. For example, user A added a first effect to a media item and during a subsequent modification of the media item, user B added a second effect to the media item. In this example, with respect to the modified media item, the first effect is attributed to user A and the second effect is attributed to user B. Continuing with this example, in some embodiments, user A and user B share in the advertising revenue generated from users watching the modified media item.

In some embodiments, the nodes of the family tree are configured to provide (822) a user of the client device with an immutable modification facility. For example, a new node may be generated from any of the nodes in the family without modifying the pre-existing nodes in the family tree. In this way, the family tree forms an immutable graph of modifications to the root media item. For example, a user may start at a leaf node in a family tree and undo modifications until the user is back to the genesis node in the family tree.

In some embodiments, owners of copyrighted audio tracks and video clips upload at least a sample of the audio tracks and video clips to reference database 344 (FIG. 3) associated with the provider of the application. In some embodiments, when the server appends the new leaf node to the family tree, server system 108 or a component thereof (e.g., analyzing module 326, FIG. 3) analyzes the one or more audio tracks and one or more video clips associated with the respective media item to determine a digital fingerprint for the audio tracks and video clips. In some embodiments, when server system 108 or a component thereof (e.g., determining module 328, FIG. 3) determines that the digital fingerprint for the audio tracks and video clips associated with the respective media item matches copyrighted audio tracks and/or video clips in reference database 344, server system 108 or a component thereof is configured to further link the new node to a node or family tree associated with the copyrighted audio tracks and/or video clips.

It will be understood that, although the terms "first," "second," etc. may be used herein to describe various elements, these elements should not be limited by these terms. These terms are only used to distinguish one element from another. For example, a first user input could be termed a second user input, and, similarly, a second user input could be termed a first user input, without changing the meaning of the description, so long as all occurrences of the "first user input" are renamed consistently and all occurrences of the "second user input" are renamed consistently. The first user input and the second user input are both user inputs, but they are not the same user input.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
    at a server system with one or more processors and memory:
        maintaining a database storing metadata for a plurality of media items, the plurality of media items including a first media item, wherein the first media item corresponds to a first node in a tree, the tree including nodes corresponding to the plurality of media items, and wherein the database stores a first metadata structure for the first media item;
        causing, based upon the metadata stored in the database, a first graphical representation of the tree to be displayed on a user interface at a client device, the first graphical representation including a first graphical element representing the first node;
        receiving, from the client device, metadata corresponding to a modified media item, wherein the modified media item is a modified version of the first media item, and wherein the metadata corresponding to the modified media item is received in connection with a user selection of the first graphical element in the first graphical representation of the tree for modifying the first media item, and user input modifying the first media item; and
    in response to receiving the metadata corresponding to the modified media item, adding a second metadata structure to the database for the modified media item, the second metadata structure including the metadata corresponding to the modified media item, and appending, to the tree, a new leaf node that is linked to the first node, wherein the new leaf node corresponds to the modified media item.

2. The method of claim 1, wherein the metadata corresponding to the modified media item includes first information identifying one or more audio tracks, second information identifying one or more visual media files, and third information identifying zero or more presentation effects.

3. The method of claim 1, wherein the modified media item includes at least one of the following:
    one or more audio tracks not included in the first media item;
    one or more visual media files not included in the first media item; or
    one or more presentation effects not included in the first media item.

4. The method of claim 1, wherein the modified media item does not include at least one of the following:
    one or more audio tracks of the first media item;
    one or more visual media files of the first media item; or
    one or more presentation effects of the first media item.

5. The method of claim 1, wherein each node in the tree is tagged with at least one of a user name or a time indicator.

6. The method of claim 1, wherein receiving, from the client device, the metadata corresponding to the modified media item comprises receiving the metadata via at least one of an application on the client device or a third-party service.

7. The method of claim 1, wherein receiving, from the client device, the metadata corresponding to the modified media item comprises receiving the metadata via one or more of:
    email;
    short message service;
    one or more social media outlets;
    one or more web-based applications; or
    one or more webpages.

8. The method of claim 1, further comprising:
    receiving a request, from a second client device, to view information in the tree, the request containing one or more selection criteria;
    in response to receiving the request, determining one or more nodes from the nodes in the tree that meet the one or more selection criteria; and
    sending information corresponding to the one or more nodes to the second client device.

9. The method of claim 8, wherein the one or more selection criteria include criteria corresponding to one or more metadata fields in metadata structures in the database, the metadata fields including at least one of:
    an author field;
    a data/time field;
    a play count field; or
    a likes field.

10. The method of claim 8, wherein the request corresponds to a user request to view the graphical representation of the tree.

11. The method of claim 1, further comprising:
    receiving a request, from a second client device, to retrieve metadata information for a particular media item so as to enable playback of the particular media item at the second client device, the playback including playing one or more audio tracks and playing one or more media files, wherein the one or more audio tracks and the one or more media files are identified in the metadata information for the particular media item;
    in response to receiving the request, identifying a node that corresponds to the particular media item; and
    sending metadata for the node that corresponds to the particular media item to the second client device.

12. The method of claim 1, further comprising:
    after appending the new leaf node, receiving an update for the modified media item; and in response to receiving the update, updating metadata in the second metadata structure.

13. The method of claim 12, wherein updating the metadata in the second metadata structure includes updating one or more metadata fields, including at least one of:
a play count field;
a comments field;
a shares field; or
a likes field.

14. The method of claim 1, further comprising, in response to receiving the metadata corresponding to the modified media item, updating metadata in the first metadata structure.

15. The method of claim 14, wherein updating the metadata in the first metadata structure includes updating the metadata to include a reference to the modified media item.

16. The method of claim 1, further comprising:
receiving, from a second client device, metadata corresponding to a new media item;
in response to receiving the metadata, determining whether the new media item corresponds to an existing tree represented in the database; and
in accordance with a determination that the new media item does not correspond to an existing tree, creating a new tree for the new media item, the new tree including a node corresponding to the new media item.

17. A server system, comprising:
one or more processors; and
a memory storing one or more programs to be executed by the one or more processors, the one or more programs comprising instructions for:
maintaining a database storing metadata for a plurality of media items, the plurality of media items including a first media item, wherein the first media item corresponds to a first node in a tree, the tree including nodes corresponding to the plurality of media items, and wherein the database stores a first metadata structure for the first media item;
causing, based upon the metadata stored in the database, a first graphical representation of the tree to be displayed on a user interface at a client device, the first graphical representation including a first graphical element representing the first node;
receiving, from the client device, metadata corresponding to a modified media item, wherein the modified media item is a modified version of the first media item, and wherein the metadata corresponding to the modified media item is received in connection with a user selection of the first graphical element in the first graphical representation of the tree for modifying the first media item, and user input modifying the first media item; and
in response to receiving the metadata corresponding to the modified media item, adding a second metadata structure to the database for the modified media item, the second metadata structure including the metadata corresponding to the modified media item, and appending, to the tree, a new leaf node that is linked to the first node, wherein the new leaf node corresponds to the modified media item.

18. The system of claim 17, wherein the one or more programs further comprise instructions for:
after appending the new leaf node, receiving an update for the modified media item; and
in response to receiving the update, updating metadata in the second metadata structure.

19. The system of claim 17, wherein the one or more programs further comprise instructions for, in response to receiving the metadata corresponding to the modified media item, updating metadata in the first metadata structure.

20. The system of claim 17, wherein the one or more programs further comprise instructions for:
receiving, from a second client device, metadata corresponding to a new media item;
in response to receiving the metadata corresponding to the new media item, determining whether the new media item corresponds to an existing tree represented in the database; and
in accordance with a determination that the new media item does not correspond to an existing tree, creating a new tree for the new media item, the new tree including a node corresponding to the new media item.

21. A non-transitory computer-readable storage medium storing one or more programs, the one or more programs comprising instructions, which, when executed by a server system with one or more processors, cause the server system to:
maintain a database storing metadata for a plurality of media items, the plurality of media items including a first media item, wherein the first media item corresponds to a first node in a tree, the tree including nodes corresponding to the plurality of media items, and wherein the database stores a first metadata structure for the first media item;
cause, based upon the metadata stored in the database, a first graphical representation of the tree to be displayed on a user interface at a client device, the first graphical representation including a first graphical element representing the first node;
receive, from the client device, metadata corresponding to a modified media item, wherein the modified media item is a modified version of the first media item, and wherein the metadata corresponding to the modified media item is received in connection with a user selection of the first graphical element in the first graphical representation of the tree for modifying the first media item, and user input modifying the first media item; and
in response to receiving the metadata corresponding to the modified media item, add a second metadata structure to the database for the modified media item, the second metadata structure including the metadata corresponding to the modified media item, and append, to the tree, a new leaf node that is linked to the first node, wherein the new leaf node corresponds to the modified media item.

22. The method of claim 1, further comprising:
storing information in the first metadata structure that identifies the new leaf node as a child node of the first node; and
storing information in the second metadata structure that identifies the first node as a parent node of the new leaf node.

23. The method of claim 1, further comprising:
causing, based upon the metadata stored in the database, a second graphical representation of the tree to be displayed on the user interface, the second graphical representation including the first graphical element representing the first node, a second graphical element representing the new leaf node, and a third graphical element connecting the first graphical element to the second graphical element, the third graphical element showing a relationship between the first node and the new leaf node, wherein in the second graphical representation of the tree, the first graphical element and the second graphical element are individually selectable via the user interface for generating an additional modified media item based upon a media item corresponding to a node represented by the selected graphical element.

* * * * *